(12) United States Patent
Ito et al.

(10) Patent No.: US 10,018,103 B2
(45) Date of Patent: Jul. 10, 2018

(54) COOLING WATER CONTROL APPARATUS

(71) Applicant: TOYOTA JIDOSHA KABUSHIKI KAISHA, Toyota-shi, Aichi-ken (JP)

(72) Inventors: Satoru Ito, Susono (JP); Takashi Amano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 222 days.

(21) Appl. No.: 14/917,134

(22) PCT Filed: Sep. 5, 2014

(86) PCT No.: PCT/JP2014/074156
§ 371 (c)(1),
(2) Date: Mar. 7, 2016

(87) PCT Pub. No.: WO2015/034108
PCT Pub. Date: Mar. 12, 2015

(65) Prior Publication Data
US 2016/0195002 A1    Jul. 7, 2016

(30) Foreign Application Priority Data

Sep. 9, 2013 (JP) .................................. 2013-186365

(51) Int. Cl.
*F01P 7/14* (2006.01)
*F01P 11/16* (2006.01)
(Continued)

(52) U.S. Cl.
CPC ................ *F01P 11/16* (2013.01); *F01N 9/00* (2013.01); *F01P 7/14* (2013.01); *F01P 11/14* (2013.01);
(Continued)

(58) Field of Classification Search
CPC ... F01P 11/00; F01P 11/14; F01P 11/16; F01P 7/00; F01P 7/14; F01P 2060/08;
(Continued)

(56) References Cited

U.S. PATENT DOCUMENTS 8,573,163 B2 * 11/2013 Kinomura et al. ....... F01P 7/14
9,863,303 B2 * 1/2018 Hosokawa et al. ....... F01P 3/20
(Continued)

FOREIGN PATENT DOCUMENTS

CN   102575569 A   7/2012
EP   2487346 A1   8/2012
(Continued)

*Primary Examiner* — Grant Moubry
(74) *Attorney, Agent, or Firm* — Hunton Andrews Kurth LLP

(57) ABSTRACT

A cooling water control apparatus is configured to control a cooling apparatus, wherein the cooling apparatus includes: a first pipe in which the cooling water passes through an engine; a second pipe in which the cooling water does not pass through the engine; a valve; and an exhaust heat recovery equipment, the cooling water control apparatus includes: a determining device for performing a determination operation to determine whether or not the valve has failure on the basis of difference between first water temperature and second water temperature; and a controlling device for controlling the cooling apparatus such that transferred heat amount in the exhaust heat recovery equipment decreases with increase of load of the engine or the transferred heat amount is maintained regardless of largeness of the load of the engine, when the determining device performs the determination operation.

5 Claims, 9 Drawing Sheets

(51) Int. Cl.
  *F01P 11/14* (2006.01)
  *F01N 9/00* (2006.01)
(52) U.S. Cl.
  CPC ...... *F01N 2240/02* (2013.01); *F01N 2240/20* (2013.01); *F01N 2410/03* (2013.01); *F01N 2900/08* (2013.01); *F01N 2900/1404* (2013.01); *F01P 2025/32* (2013.01); *F01P 2031/20* (2013.01); *F01P 2060/08* (2013.01); *F01P 2060/16* (2013.01); *Y02T 10/47* (2013.01)
(58) Field of Classification Search
  CPC ............... F01P 2060/16; F01P 2031/20; F01P 2025/32; F01N 9/00; F01N 2900/1404; F01N 2900/08; F01N 2240/20; F01N 2240/02; F01N 2410/03; Y02T 10/47
  See application file for complete search history.

(56) References Cited

U.S. PATENT DOCUMENTS

| 2011/0131961 | A1 | 6/2011 | Lee et al. |
| 2012/0137992 | A1 | 6/2012 | Kinomuka et al. |
| 2013/0213600 | A1 | 8/2013 | Saitoh |
| 2016/0281586 | A1* | 9/2016 | Hosokawa ............... F01P 11/16 |

FOREIGN PATENT DOCUMENTS

| JP | 2006-283711 A | 10/2006 |
| JP | 2008-223725 A | 9/2008 |
| JP | 2011-241773 A | 12/2011 |
| JP | 4883225 B2 | 2/2012 |
| JP | 2012-102688 A | 5/2012 |

* cited by examiner

[FIG. 1]
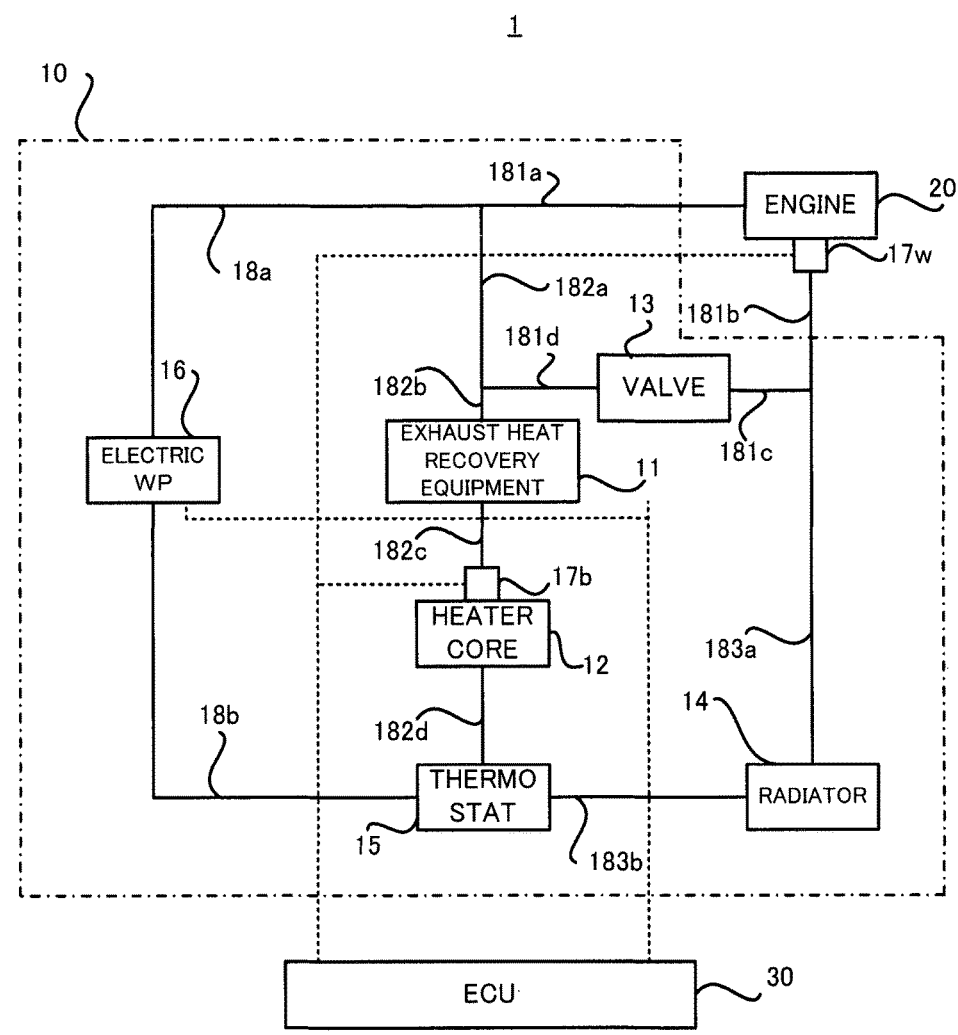

[FIG. 2]
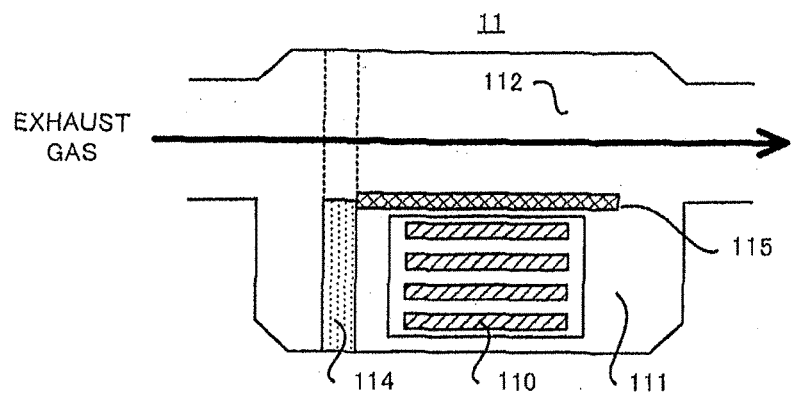
(a) EXHAUST VALVE = VALVE CLOSE STATE
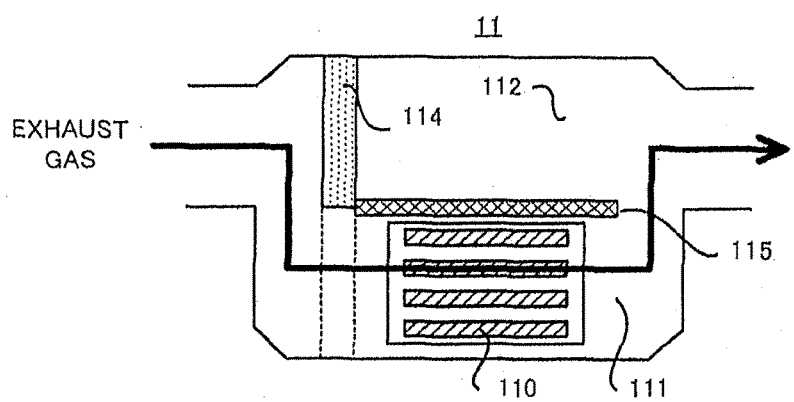
(b) EXHAUST VALVE = VALVE OPEN STATE (FULL OPEN)
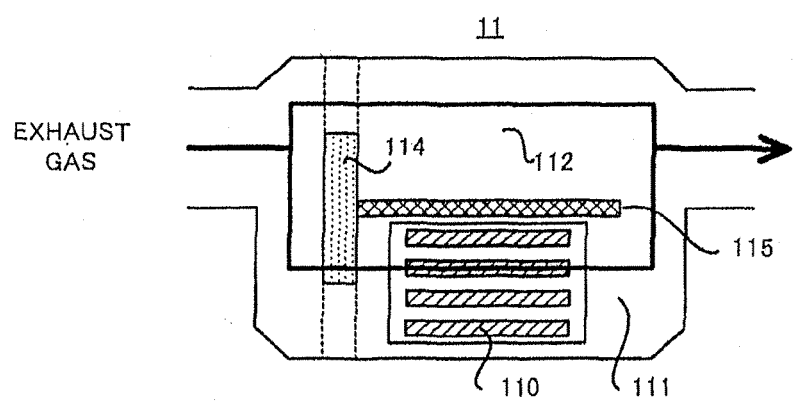
(c) EXHAUST VALVE = VALVE OPEN STATE (PARTIAL OPEN)

[FIG. 3]
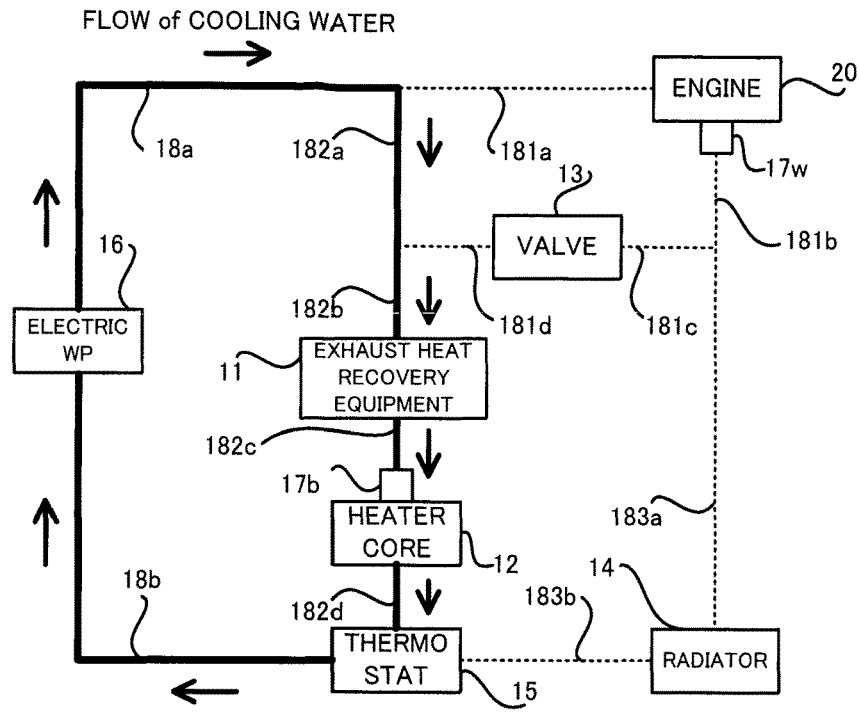
[FIG. 4]
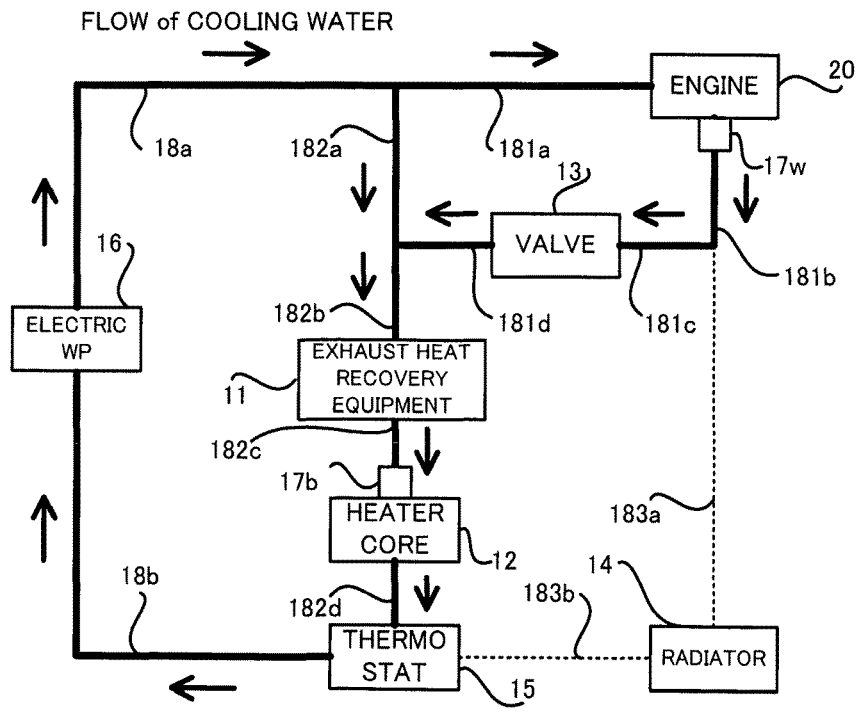

[FIG. 5]
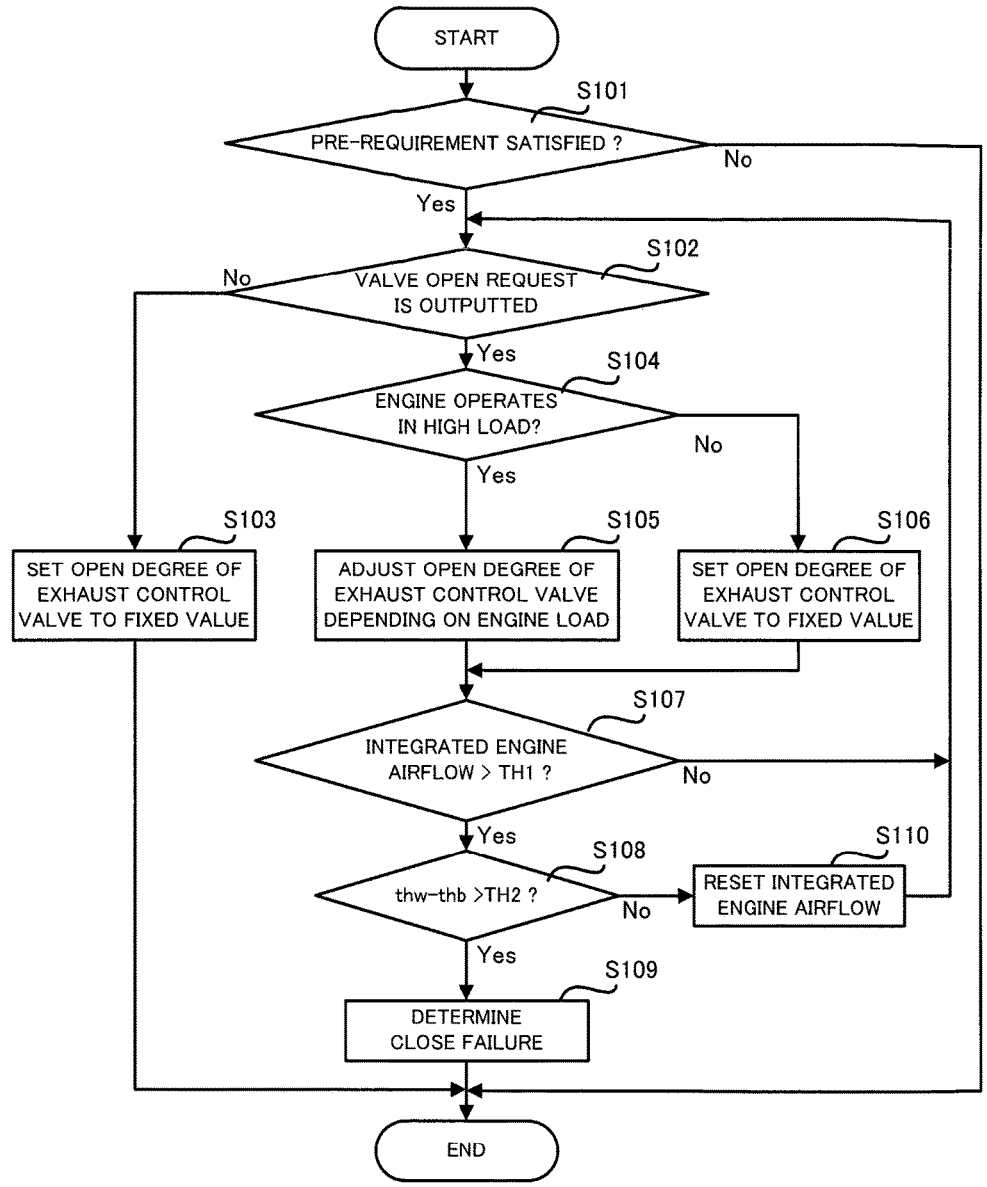

[FIG. 6]
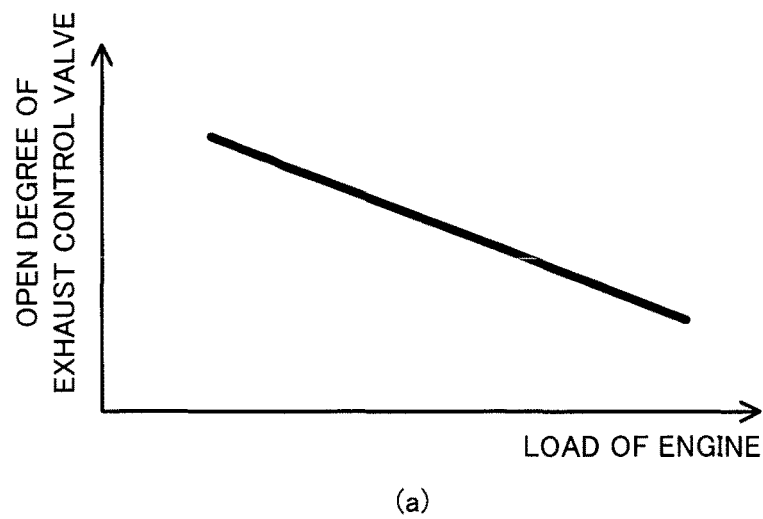
(a)
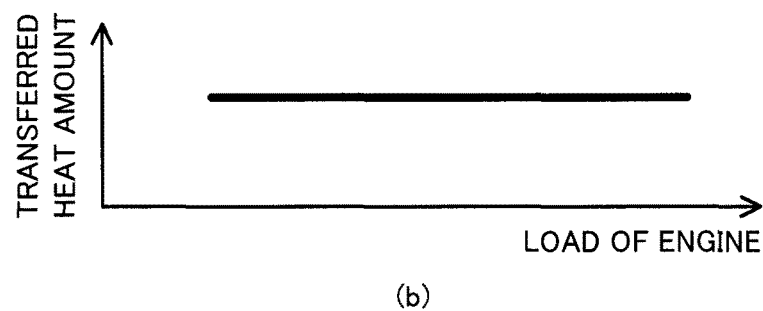
(b)
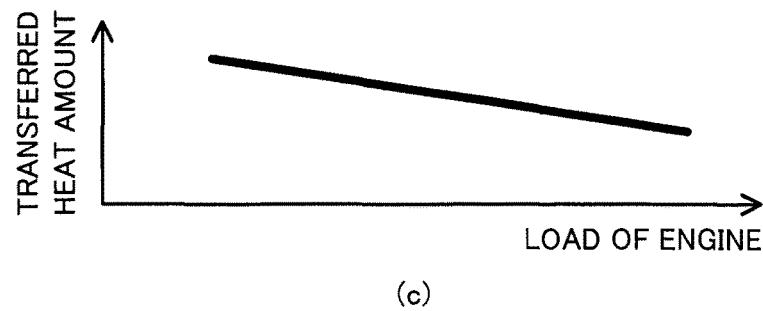
(c)

[FIG. 7]
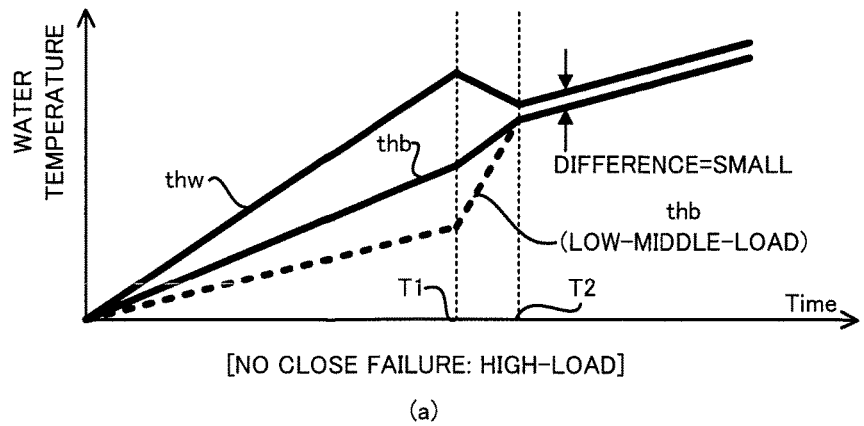
[NO CLOSE FAILURE: HIGH-LOAD]
(a)
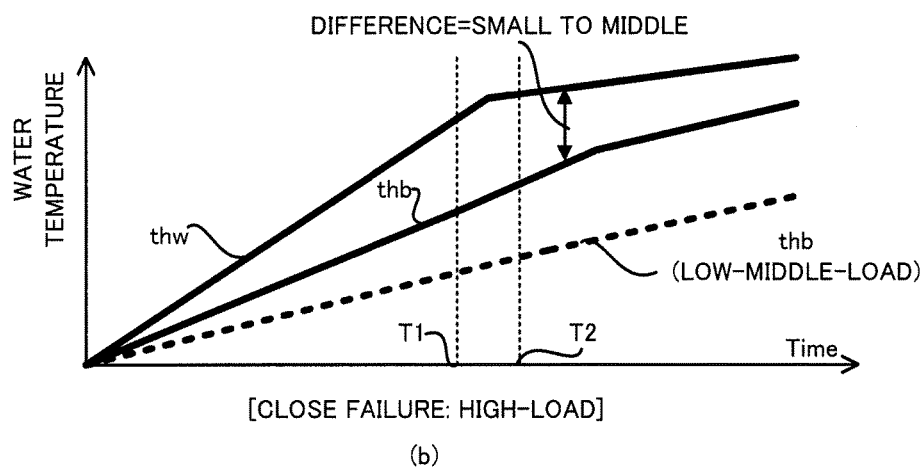
[CLOSE FAILURE: HIGH-LOAD]
(b)
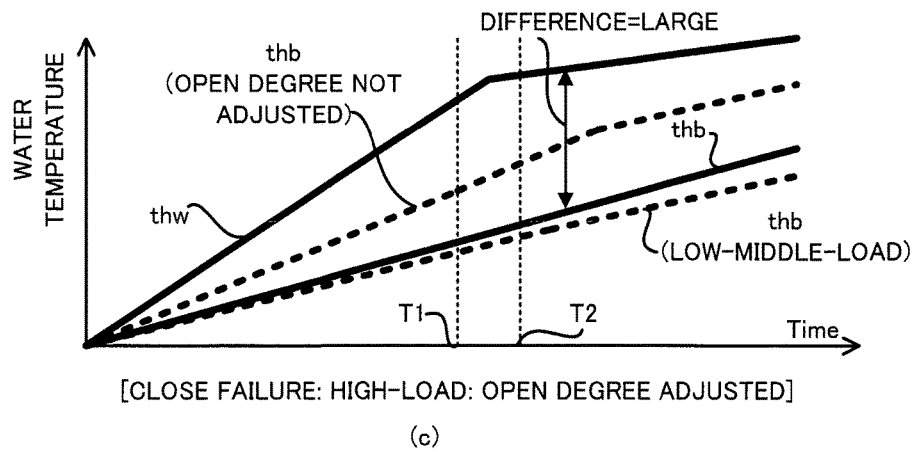
[CLOSE FAILURE: HIGH-LOAD: OPEN DEGREE ADJUSTED]
(c)

[FIG. 8]
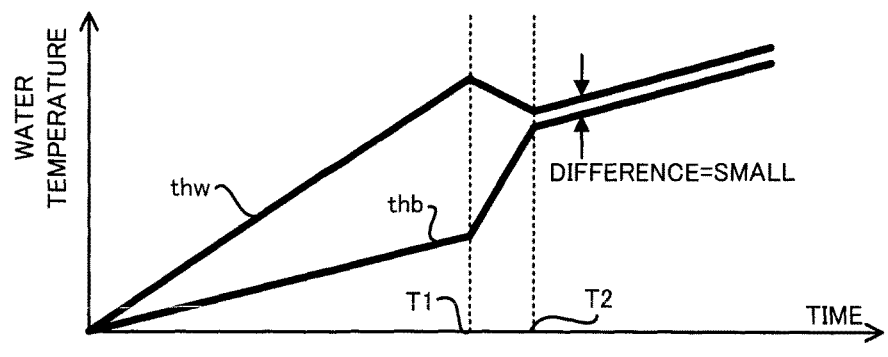
[NO CLOSE FAILURE: LOW-MIDDLE-LOAD]
(a)
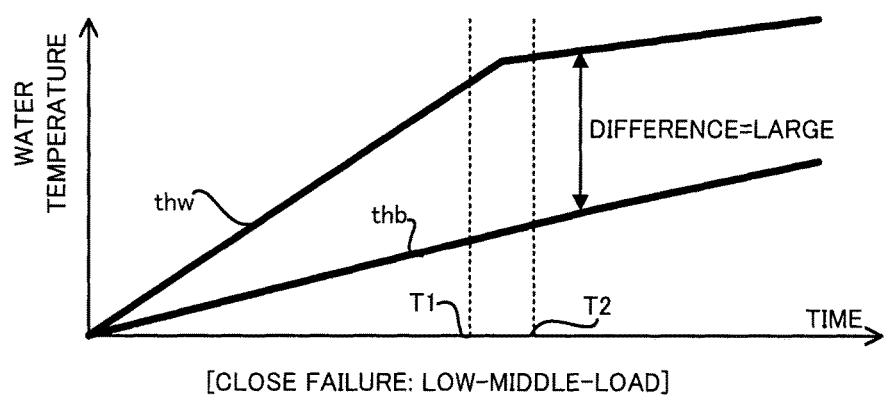
[CLOSE FAILURE: LOW-MIDDLE-LOAD]
(b)

[FIG. 9]
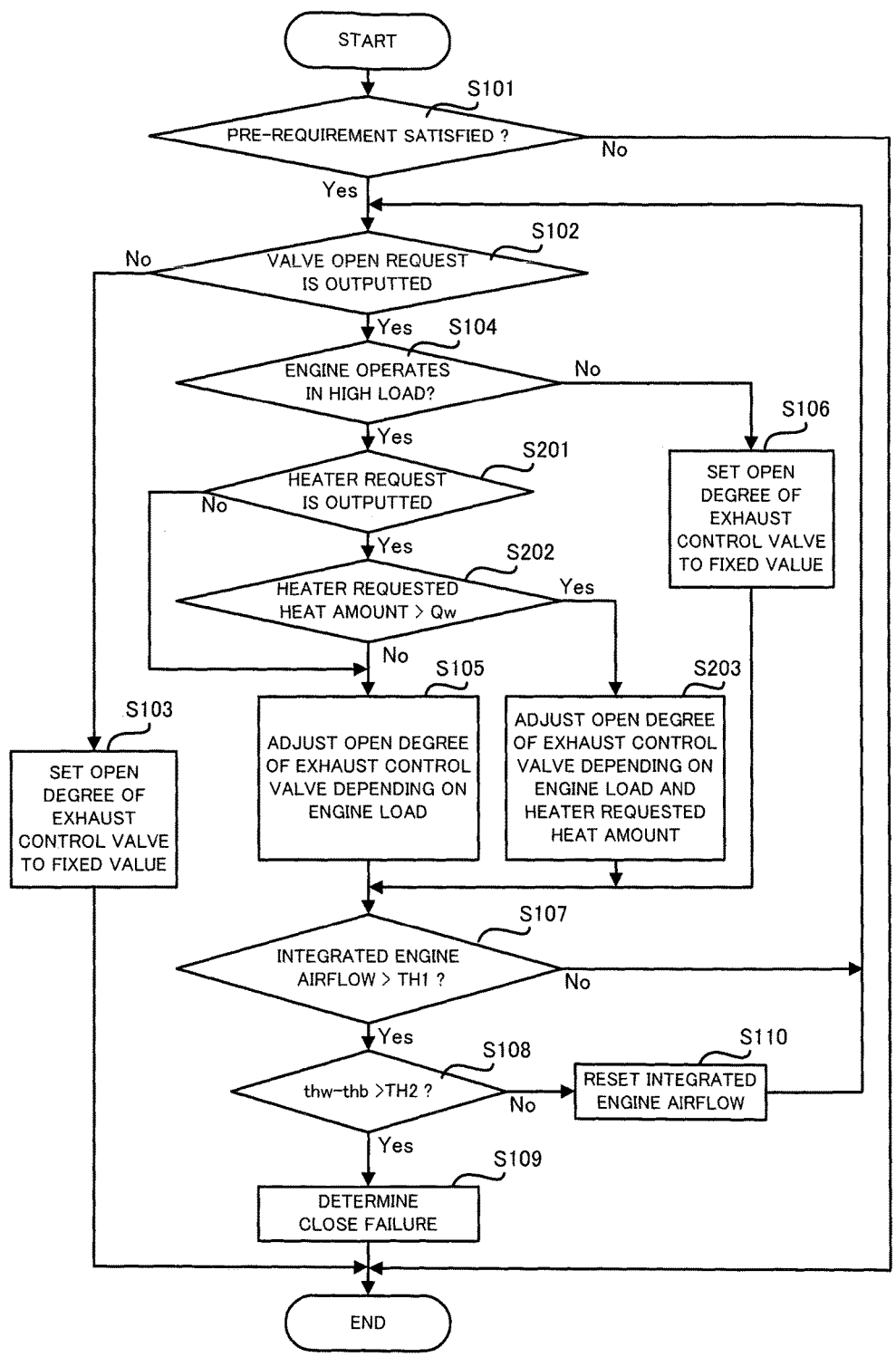

[FIG. 10]
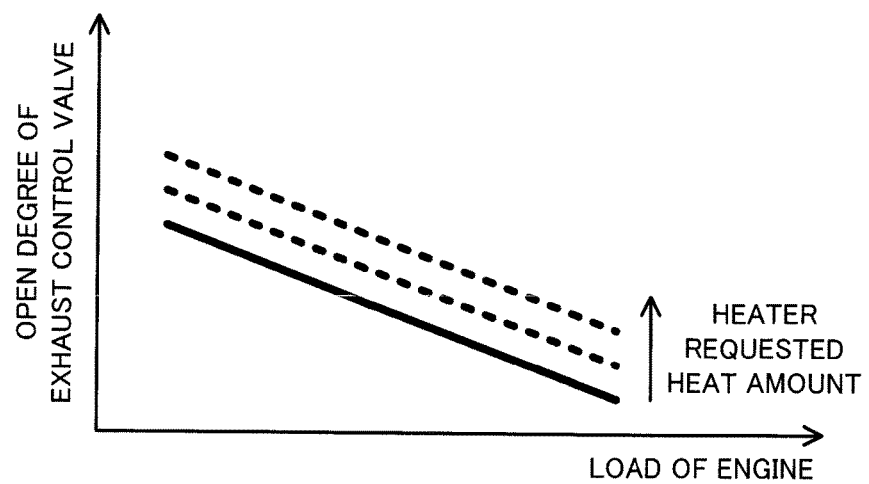

COOLING WATER CONTROL APPARATUS

CROSS-REFERENCE TO RELATED APPLICATIONS

This is a national phase application based on the PCT International Patent Application No. PCT/JP2014/074156 filed Sep. 5, 2014, claiming priority to Japanese Patent Application No. 2013-186365 filed Sep. 9, 2013, the entire contents of both of which are incorporated herein by reference.

TECHNICAL FIELD

The present invention relates to a cooling water control apparatus for controlling a cooling apparatus which cools and/or warms an engine by circulating cooling water, for example.

BACKGROUND ART

A cooling apparatus which circulates cooling water in order to cool and/or warm an engine is known heretofore. For example, a Patent Literature 1 discloses a cooling apparatus in which an engine water pipe which passes through the engine and a bypass water pipe which bypasses the engine are connected via a valve.

The cooling apparatus disclosed in the Patent Literature 1 uses single valve to change a flowing aspect of the cooling water. Therefore, if the valve has failure (the valve is out of order), the flowing aspect of the cooling water may be likely different from a desired aspect. Thus, in the cooling apparatus which is provided with the valve, it is preferable to determine (judge) whether or not the valve has the failure. Incidentally, the Patent Literature 1 discloses logic which determines that the valve has open failure (namely, failure in which a state of the valve remains to be a valve open state against a valve close request) which is one example of the failure of the valve if there is a large difference between an estimated value of engine water temperature which is estimated from integrated intake airflow of the engine and an actual value of the engine water temperature.

Patent Literatures 2 and 3 are presented as a background art relating to the present invention.

CITATION LIST

Patent Literature

[Patent Literature 1] Japanese Patent Application Laid Open No. 2011-241773
[Patent Literature 2] Japanese Patent Application Laid Open No. 2008-223725
[Patent Literature 3] Japanese Patent Application Laid Open No. 2012-102688

SUMMARY OF INVENTION

Technical Problem

On the other hand, another logic which determines whether or not the valve has the failure on the basis of a difference between temperature of the cooling water in the engine water pipe (it is referred to as "engine water temperature", hereinafter) and temperature of the cooling water in the bypass water pipe (it is referred to as "bypass water temperature", hereinafter) may be presented. For example, another logic which determines whether or not the valve has close failure (namely, failure in which the state of the valve remains to be a valve close state against a valve open request) which is one example of the failure of the valve will be explained here. If the state of the valve is the valve close state, the engine water temperature has a relatively strong tendency to increase faster than the bypass water temperature (namely, the difference between the engine water temperature and the bypass water temperature has a relatively strong tendency to become larger). Therefore, the difference between the engine water temperature and the bypass water temperature in the case where the state of the valve is the valve close state is likely larger than the difference between the engine water temperature and the bypass water temperature in the case where the state of the valve is the valve open state. Therefore, the logic, which determines whether or not the valve has the failure on the basis of the difference between the engine water temperature and the bypass water temperature, can determine that the valve has the close failure, if the difference between the engine water temperature and the bypass water temperature is large (for example, larger than a predetermined threshold value) when the valve open request is given to the valve.

On the other hand, an exhaust heat recovery equipment transfers, to the cooling water, heat of relatively high-temperature exhaust gas which is exhausted from the engine. Therefore, the more heat amount transferred to the cooling water in the exhaust heat recovery equipment becomes, the higher the temperature of the cooling water in the bypass water pipe becomes. Namely, the more the heat amount transferred to the cooling water in the exhaust heat recovery equipment becomes, the smaller the difference between the engine water temperature and the bypass water temperature. As a result, even in the case where the valve has the close failure, it may not be determined that the difference between the engine water temperature and the bypass water temperature is large (for example, larger than the predetermined threshold value), depending on the heat amount transferred to the cooling water in the exhaust heat recovery equipment, which is a technical problem. As a result, accuracy of determination by the logic which determines whether or not the valve has the close failure may be deteriorated depending on the heat amount transferred to the cooling water in the exhaust heat recovery equipment, which is a technical problem.

Incidentally, the above technical problem may occur not only in the logic which determines the valve has the close failure but also generally in a logic which determines the valve has the failure on the basis of the difference between the engine water temperature and the bypass water temperature. The reason is as follows. The logic, which determines the valve has the failure on the basis of the difference between the engine water temperature and the bypass water temperature, focuses a variation of the difference between the engine water temperature and the bypass water temperature which is caused by the failure of the valve. On the other hand, the heat amount transferred to the cooling water in the exhaust heat recovery equipment may also cause the variation of the difference, which may result in a wrong determination.

In view of the aforementioned problem, it is therefore an object of the present invention to provide, for example, a cooling water control apparatus which is configured to determine more accurately whether or not the valve has the failure in the cooling apparatus in which a first pipe in which the cooling water is circulated such that the cooling water passes through the engine and a second pipe in which the cooling water is circulated such that the cooling water does not pass through the engine are connected via a valve.

Solution to Problem

The cooling water control apparatus is configured to control a cooling apparatus, the cooling apparatus is provided with: (i) a first pipe in which cooling water is circulated such that the cooling water passes through an engine; (ii) a second pipe in which the cooling water is circulated such that the cooling water does not pass through the engine; (iii) a valve which is located at a downstream side of the engine and which is configured to adjust a flow amount of the cooling water flowing from the first pipe to the second pipe; and (iv) an exhaust heat recovery equipment located on the second pipe. The exhaust heat recovery equipment is provided with a heat exchange pipe into which exhaust gas flows and in which heat exchange between the exhaust gas and the cooling water is performed and an adjuster which is configured to adjust a flow amount of the exhaust gas which flows into the heat exchange pipe. The cooling water control apparatus is provided with a controller which is programmed to perform a determination operation to determine whether or not the valve has failure on the basis of difference between first water temperature and second water temperature, wherein the first water temperature is temperature of the cooling water in a pipe part of the first pipe which is located between the engine and the valve, the second water temperature is temperature of the cooling water in the second pipe; and further programmed to control the cooling apparatus such that (i) transferred heat amount which is transferred to the cooling water in the exhaust heat recovery equipment decreases with increase of load of the engine or (ii) the transferred heat amount is maintained regardless of largeness of the load of the engine, when the determining device performs the determination operation.

According to the cooling water control apparatus, the cooling apparatus which cools the engine by circulating the cooling water can be controlled.

The cooling apparatus is provided with the first pipe, the second pipe, the valve and the exhaust heat recovery equipment.

The first pipe is a cooling water pipe (in other words, cooling water channel) for circulating the cooling water such that the cooling water passes through the engine (for example, a water jacket of the engine). On the other hand, the second pipe is a cooling water pipe (in other words, cooling water channel) for circulating the cooling water such that the cooling water does not pass through the engine (in other words, the cooling water bypasses the engine).

The first pipe and the second pipe is connected (in other words, jointed) via the valve. Especially, the valve connects the first pipe and the second pipe at the downstream side of the engine (namely, the downstream side of the engine along a flow direction of the cooling water). Incidentally, considering the fact that the first pipe circulates the cooling water such that the cooling water passes through the engine and the second pipe circulates the cooling water such that the cooling water does not pass through the engine, the valve may connect a pipe part of the first pipe which is located on the downstream side of the engine and the second pipe. However, the valve may connect the first pipe and the second pipe on the upstream side of the engine (namely, the upstream side of the engine along the flow direction of the cooling water).

The valve adjusts the flow amount of the cooling water which flows from the first pipe to the second pipe. The valve changes a state of the valve itself from the valve open state to the valve close state or from the valve close state to the valve open state in response to a command request for changing the state of the valve, in order to adjust the flow amount of the cooling water which flows from the first pipe to the second pipe. The valve whose state is the valve open state allows a first flow amount of the cooling water to flow from the first pipe to the second pipe, for example. On the other hand, the valve whose state is the valve close state allows a second flow amount (however, the second flow amount is smaller than the first flow amount) of the cooling water to flow first pipe to the second pipe, for example.

The exhaust heat recovery equipment transfers, to the relatively low-temperature cooling water which flows into the exhaust heat recovery equipment, heat of relatively high-temperature exhaust gas (namely, the exhaust gas of the engine) which flows into the exhaust heat recovery equipment. Namely, a heat transfer (in other words, a heat exchange) between the exhaust gas and the cooling water is performed in the exhaust heat recovery equipment.

The exhaust heat recovery equipment which performs the heat transfer is located on the second pipe. Therefore, the exhaust heat recovery equipment transfers the heat of the exhaust gas to the cooling water in the second pipe. Namely, the temperature of the cooling water in the second pipe could increase due to the heat transfer between the exhaust gas and the cooling water in the exhaust heat recovery equipment.

The cooling water control apparatus determines whether or not the valve has the failure for such a cooling apparatus. In order to determine whether or not the valve has the failure, the cooling water control apparatus is provided with the determining device and the controlling device.

The determining device performs the determination operation to determine whether or not the valve has the failure on the basis of the difference between the first water temperature and the second water temperature. The first water temperature is temperature of the cooling water in the first pipe. Especially, the first water temperature is preferably temperature of the cooling water in the pipe part of the first pipe which is located between the engine and the valve (however, the pipe part includes a pipe part of the first pipe which is located between the water block of the engine and the valve). In other words, the first water temperature is temperature of the cooling water in a pipe part of the first pipe which is located on the downstream side of the engine and is located on the upstream side of the valve (however, the pipe part includes a pipe part of the first pipe which is located on the downstream side of the water block of the engine and is located on the upstream side of the valve). On the other hand, the second water temperature is temperature of the cooling water in the second pipe.

Here, the determination operation which determines whether or not the valve has a close failure (namely, failure in which the state of the valve remains to be in a valve close state against a valve open request) which is one example of the failure of the valve will be explained, as one example of the determination operation which determines whether or not the valve has the failure. If the state of the valve is the valve close state, the cooling water remains in the first pipe and the cooling water circulates in the second pipe. Thus, if the state of the valve is the valve close state, the first water temperature has a relatively strong tendency to increase faster than the second water temperature (namely, the difference between the first water temperature and the second water temperature has a relatively strong tendency to become larger). On the other hand, if the state of the valve is the valve open state, the cooling water circulates in both of the first pipe and the second pipe. In addition, the cooling water circulating in the first pipe and the cooling water circulating in the second pipe are mixed. Thus, if the state of the valve is the valve open state, the difference between the first water temperature and the second water temperature has a relatively strong tendency to become smaller. Therefore, the determining device can determine that the valve has the close failure if the difference between the first water temperature and the second water temperature is large (for example, larger than a predetermined threshold value) under such a condition that the valve open request is given to the valve (namely, under such a condition that the difference between the first water temperature and the second water temperature is estimated to be small because the state of the valve is to be the valve open state under normal circumstances).

As discussed above, the determining device can determine whether or not the valve has the failure by focusing on the difference between the first water temperature and the second water temperature which varies depending on the change of the state of the valve. Namely, the determining device can determine whether or not the valve has the failure by focusing on the difference between the first water temperature and the second water temperature which varies depending on the presence or the absence of the failure of the valve.

However, the difference between the first water temperature and the second water temperature may vary depending on the heat transfer from the exhaust gas to the cooling water in the exhaust heat recovery equipment, in addition to varying depending on the change of the state of the valve (alternatively, the failure of the valve). Specifically, as described above, since the exhaust heat recovery equipment is located on the second pipe, the second water temperature increases with increase of the transferred heat amount which is transferred to the cooling water in the exhaust heat recovery equipment. For example, the transferred heat amount increases with the increase of the load of the engine, and thus, the second water temperature increases with the increase of the load of the engine. As a result, the difference between the first water temperature and the second water temperature decreases with the increase of the transferred heat amount regardless of the presence or the absence of the change of the state of the valve or regardless of the presence or the absence of the failure of the valve. Therefore, even when the determining device determines on the basis of the difference between the first water temperature and the second water temperature that the valve has the failure, the valve could have no failure actually. Namely, even when the determining device determines on the basis of the difference between the first water temperature and the second water temperature that the valve has the failure, the difference between the first water temperature and the second water temperature, which is a base of such a determination, could be caused not by the change of the state of the valve or the failure of the valve but by the variation of the transferred heat amount. Thus, in order to improve the accuracy of the determination operation performed by the determining device, it is preferable to suppress the variation of the difference between the first water temperature and the second water temperature caused by the variation of the transferred heat amount.

So, the controlling device suppresses the variation of the difference between the first water temperature and the second water temperature depending on the transferred heat amount (for example, suppresses the increase of the second water temperature depending on the transferred heat amount). Specifically, the controlling device may control the cooling apparatus such that the transferred heat amount decreases with the increase of the load of the engine, when the determining device performs the determination operation. Alternatively, the controlling device may control the cooling apparatus such that the transferred heat amount is maintained regardless of the largeness of the load of the engine, in addition to or instead of controlling the cooling apparatus such that the transferred heat amount decreases with the increase of the load of the engine, when the determining device performs the determination operation.

By the operation of the controlling device, the transferred heat amount decreases or is maintained even in the case where the load of the engine becomes large, when the determining device performs the determination operation. Namely, the transferred heat amount hardly increases or does not increase at all regardless of the largeness of the load of the engine, when the determining device performs the determination operation. Therefore, the increase of the second water temperature depending on the transferred heat amount is suppressed when the determining device performs the determination operation. As a result, the variation of the difference between the first water temperature and the second water temperature depending on the transferred heat amount is appropriately suppressed. Thus, when the determining device determines on the basis of the difference between the first water temperature and the second water temperature that the valve has the failure, the valve is more likely to have the failure actually. Namely, when the determining device determines on the basis of the difference between the first water temperature and the second water temperature that the valve has the failure, the difference between the first water temperature and the second water temperature, which is a base of such a determination, is more likely caused not by the variation of the transferred heat amount but by the change of the state of the valve or the failure of the valve. Thus, the accuracy of the determination operation performed by the determining device improves.

As described above, the cooling water control apparatus can determine more accurately whether or not the valve has the failure in the cooling apparatus in which a first pipe in which the cooling water is circulated such that the cooling water passes through the engine and a second pipe in which the cooling water is circulated such that the cooling water does not pass through the engine are connected via the valve.

In an another aspect of the cooling water control apparatus, the controlling device is configured to control the cooling apparatus such that the transferred heat amount increases with increase of requested heat amount which is requested for a predetermined operation using heat of the cooling water.

According to this aspect, even when the controlling apparatus controls the cooling apparatus such that the transferred heat amount decreases with the increase of the load of the engine or the transferred heat amount is maintained, the controlling device can control the cooling apparatus to ensure the transferred heat amount which can satisfy the requested heat amount. As a result, the cooling water control apparatus can perform the predetermined operation appropriately while determining more accurately whether or not the valve has the failure.

Incidentally, one example of the predetermined operation which uses the heat of the cooling water includes a heating operation (a heater operation), a defroster operation, device operation, and the like.

Incidentally, the controlling device may be configured to control the cooling apparatus such that (i-1) the transferred heat amount decreases with the increase of the load of the engine or (i-2) the transferred heat amount is maintained regardless of largeness of the load of the engine, and (ii) the transferred heat amount increases (in other word, an additional amount is added to the transferred heat amount) with the increase of the requested heat amount, when the determining device performs the determination operation.

In an another aspect of the cooling water control apparatus, the cooling apparatus is further provided with: a heater core which is located at a downstream side of the exhaust heat recovery equipment and which is configured to be able to recover heat of the cooling water, the controlling device is configured to control the cooling apparatus such that the transferred heat amount increases by additional heat amount corresponding to a shortage of recovered heat amount which the heater core can recover from the cooling water relative to requested heat amount which is requested for a predetermined operation using heat of the cooling water, when the recovered heat amount is insufficient relative to the requested heat amount only by controlling the cooling apparatus such that (i) the transferred heat amount decreases with the increase of the load of the engine or (ii) the transferred heat amount is maintained regardless of largeness of the load of the engine.

According to this aspect, even when the controlling apparatus controls the cooling apparatus such that the transferred heat amount decreases with the increase of the load of the engine or the transferred heat amount is maintained, the controlling device can control the cooling apparatus to ensure the transferred heat amount which can satisfy the requested heat amount. As a result, the cooling water control apparatus can perform the predetermined operation appropriately while determining more accurately whether or not the valve has the failure.

In an another aspect of the cooling water control apparatus, the controlling device is configured to control the cooling apparatus such that (i) the transferred heat amount decreases with the increase of the load of the engine or (ii) the transferred heat amount is maintained regardless of the largeness of the load of the engine, when the load of the engine is same as or larger than a predetermined value.

In the case where the load of the engine is same as or larger than the predetermined value, the transferred heat amount is easier to increase, compared to the case where the load of the engine is not same as or larger than the predetermined value. Therefore, in the case where the load of the engine is same as or larger than the predetermined value, the difference between the first water temperature and the second water temperature is easier to vary due to the variation of the transferred heat amount, compared to the case where the load of the engine is not same as or larger than the predetermined value. Thus, according to this aspect, the controlling device can suppress the variation of the difference between the first water temperature and the second water temperature caused by the variation of the transferred heat amount, when the transferred heat amount is easier to vary due to the variation of the transferred heat amount (namely, when the load of the engine is same as or larger than the predetermined value).

Incidentally, the controlling device may not control the cooling apparatus such that (i) the transferred heat amount decreases with the increase of the load of the engine or (ii) the transferred heat amount is maintained regardless of the largeness of the load of the engine, when the load of the engine is not same as or larger than the predetermined value. Namely, the controlling device may not perform a control process which is aimed at the transferred heat amount, when the load of the engine is not same as or larger than the predetermined value.

In an another aspect of the cooling water control apparatus, the exhaust heat recovery equipment comprises: a heat exchange pipe into which exhaust gas flows and in which heat exchange between the flowed exhaust gas and the cooling water is performed; and an adjusting device which is configured to adjust a flow amount of the exhaust gas which flows into the heat exchange pipe, the controlling device is configured to control the adjusting device such that the flow amount of the exhaust gas which flows into the heat exchange pipe increases with the increase of the load of the engine.

According to this aspect, the controlling device can suppress the variation of the difference between the first water temperature and the second water temperature caused by the variation of the transferred heat amount, by adjusting the flow amount of the exhaust gas which flows into the heat exchange pipe in which the heat exchange is performed between the exhaust gas and the cooling water (namely, in which the heat of the exhaust gas is transferred to the cooling water).

Especially, the controlling device can suppress the variation of the difference between the first water temperature and the second water temperature caused by the variation of the transferred heat amount, without adjusting a flow amount of the cooling water which flows into the exhaust heat recovery equipment. Namely, the controlling device can suppress the variation of the difference between the first water temperature and the second water temperature caused by the variation of the transferred heat amount, while maintaining such a condition that the cooling water flows into and flows outwardly from the exhaust heat recovery equipment. Therefore, the cooling water in the exhaust heat recovery equipment hardly boils or does not boil at all due to the remains (retention) of the cooling water in the exhaust heat recovery equipment.

The operation and other advantages of the present invention will become more apparent from embodiments explained below.

BRIEF DESCRIPTION OF DRAWINGS

FIG. 1 is a block diagram illustrating one example of a configuration of a vehicle (especially, a configuration relating to a cooling apparatus) of the present embodiment.

FIG. 2 is a cross-sectional diagram illustrating a configuration of an exhausting heat recovery equipment, wherein FIG. 2(*a*) shows a valve close state, FIG. 2(*b*) shows a valve full open state, and FIG. 2(*c*) shows a valve partial open state.

FIG. 3 is a block diagram illustrating the circulation aspect of the cooling water when the engine water temperature is in a first range.

FIG. 4 is a block diagram illustrating the circulation aspect of the cooling water when the engine water temperature is in a second range which is higher than the first range.

FIG. 5 is a flow chart illustrating the first example of the determination operation for determining whether or not the switch valve has the failure FIG. 6 is a graph illustrating one example of the correlation information which indicates the relationship between the load of the engine and the open degree of the exhaust control valve.

FIG. 7 is a graph illustrating the variation aspect of the engine water temperature thw and the bypass water temperature thb in the case where the switch valve does not have the close failure under such a condition that the engine operates in the high-load operation area and the variation aspect of the engine water temperature thw and the bypass water temperature thb in the case where the switch valve has the close failure under such a condition that the engine operates in the high-load operation area.

FIG. 8 is a graph illustrating the variation aspect of the engine water temperature thw and the bypass water temperature thb in the case where the switch valve does not have the close failure under such a condition that the engine operates in a low-and-middle-load operation area and the variation aspect of the engine water temperature thw and the bypass water temperature thb in the case where the switch valve 13 has the close failure under such a condition that the engine operates in the low-and-middle-load operation area.

FIG. 9 is a flow chart illustrating the second example of the determination operation for determining whether or not the switch valve has the failure.

FIG. 10 is a graph illustrating one example of the correlation information which indicates the relationship between both of the load of the engine and the heater requested heat amount and the open degree of the exhaust control valve.

DESCRIPTION OF EMBODIMENTS

Hereinafter, a vehicle 1 having a cooling apparatus 10 will be explained as an embodiment of the present invention, with reference to the drawings.

(1) Configuration of Vehicle

Firstly, a configuration of the vehicle 1 (especially, a configuration relating to the cooling apparatus 10) of the present embodiment will be explained with reference to FIG. 1. FIG. 1 is a block diagram illustrating one example of the configuration of the vehicle 1 (especially, a configuration relating to the cooling apparatus 10) of the present embodiment.

As illustrated in FIG. 1, the vehicle 1 of the present embodiment is provided with: a cooling apparatus 10; an engine 20; and an ECU 30.

The cooling apparatus 10 is provided with: a switch valve 13; an electric WP (Water Pump) 16; a water temperature sensor 17b; and a water temperature sensor 17w. Moreover, the cooling apparatus 10 may be provided with: an exhaust heat recovery equipment 11; a heater core 12; a radiator 14; and a thermostat 15. Moreover, the cooling apparatus 10 is provided with a cooling water pipe (water channel) 18 which includes a cooling water pipe 18a; a cooling water pipe 18b; a cooling water pipe 181a; a cooling water pipe 181b; a cooling water pipe 181c; a cooling water pipe 181d; a cooling water pipe 182a; a cooling water pipe 182b; a cooling water pipe 182c; a cooling water pipe 182d; a cooling water pipe 183a; and a cooling water pipe 183b.

The electric WP 16 is a pump which ejects a desired amount of cooling water. The cooling water ejected from the electric WP 16 flows into the cooling water pipe 18a. The cooling water pipe 18a branches into the cooling water pipe 181a and the cooling water pipe 182a.

The cooling water pipe 181a is connected to the engine 20. The cooling water pipe 181b extends from the engine 20. The cooling water pipe 181b branches into the cooling water pipe 181c which is connected to the switch valve 13 and the cooling water pipe 183a which is connected to the radiator 14. The cooling water pipe 181d extends from the switch valve 13. The cooling water pipe 181d is connected to the cooling water pipe 182b together with the cooling water pipe 182a. The cooling water pipe 182b is connected to the exhaust heat recovery equipment 11. The cooling water pipe 182c extends from the exhaust heat recovery equipment 11 and is connected to the heater core 12. The cooling water pipe 182d extends from the heater core 12 and is connected to the thermostat 15. The cooling water pipe 18b extends from the thermostat 15 and is connected to the electric WP 16. Namely, the cooling water which is ejected from the electric WP 16 returns to the electric WP 16 by passing through the cooling water pipe 18a, the cooling water pipe 181a, the cooling water pipe 181b, the cooling water pipe 181c, the cooling water pipe 181d, the cooling water pipe 182b, the cooling water pipe 182c, the cooling water pipe 182d and the cooling water pipe 18b in this order. Namely, the cooling water pipe 18a, the cooling water pipe 181a, the cooling water pipe 181b, the cooling water pipe 181c, the cooling water pipe 181d, the cooling water pipe 182b, the cooling water pipe 182c, the cooling water pipe 182d and the cooling water pipe 18b forms a main pipe which passes through the engine 20 (i.e. does not bypass the engine 20) and does not pass through the radiator 14 (i.e. bypasses the radiator 14). Incidentally, the main pipe is one example of the above described "first pipe".

On the other hand, the cooling water pipe 182a is connected to the cooling water pipe 182b together with the cooling water pipe 181d which extends from the switch valve 13. The cooling water 182b is connected to the exhaust heat recovery equipment 11. The cooling water pipe 182c extends from the exhaust heat recovery equipment 11. Namely, the cooling water which is ejected from the electric WP 16 returns to the electric WP 16 by passing through the cooling water pipe 18a, the cooling water pipe 182a, the cooling water pipe 182b, the cooling water pipe 182c, the cooling water pipe 182d and the cooling water pipe 18b in this order. Namely, the cooling water pipe 18a, the cooling water pipe 182a, the cooling water pipe 182b, the cooling water pipe 182c, the cooling water pipe 182d and the cooling water pipe 18b forms a bypass pipe which does not pass through the engine 20 (i.e. bypasses the engine 20). Incidentally, the bypass pipe is one example of the above described "second pipe".

On the other hand, the cooling water pipe 183b extends from the radiator 14 and is connected to the thermostat 15. Namely, the cooling water which is ejected from the electric WP 16 returns to the electric WP 16 by passing through the cooling water pipe 18a, the cooling water pipe 181a, the cooling water pipe 181b, the cooling water pipe 183a, the cooling water pipe 183b and the cooling water pipe 18b in this order. Namely, the cooling water pipe 18a, the cooling water pipe 181a, the cooling water pipe 181b, the cooling water pipe 183a, the cooling water pipe 183b and the cooling water pipe 18b forms a sub pipe which passes through the engine 20 (i.e. does not bypass the engine 20) and passes through the radiator 14 (i.e. does not bypass the radiator 14).

The engine 20 is a machine which generates power by burning mixture gas of the supplied fuel and air. For example, the engine 20 is a gasoline engine, a diesel engine or the like. The engine 20 may be provided on a hybrid vehicle and the like. The cooling water flows into an engine block of the engine 20 via the cooling water pipe 181a. The cooling water flowing into the engine 20 passes through a water jacket of the engine 20. The cooling water passing through the water jacket flows outwardly from an engine head or the engine block of the engine 20 to the cooling water pipe 181b. The water jacket is located around cylinder(s), which is not illustrated in FIG. 1, in the engine 20. The cylinder exchanges heat with the cooling water which passes through the water jacket. As a result, the engine 20 is cooled.

The water temperature sensor 17w measures temperature thw of the cooling water which passes through the engine 20 (hereinafter, it is referred to as "engine water temperature thw"). Especially, the water temperature sensor 17w is located at the cooling water pipe 181b, wherein the cooling water pipe 181b is located in the water jacket of the engine 20 or is located between the water jacket of the engine 20 and the switch valve 13. Namely, in the present embodiment, temperature of the cooling water passing through the cooling water pipe 181b which is located in the water jacket of the engine 20 or is located between the water jacket of the engine 20 and the switch valve 13 is used as the engine water temperature thw. However, the water temperature sensor 17w may be located at the cooling water pipe 181c which is located between the water jacket of the engine 20 and the switch valve 13. The engine water temperature thw which is measured by the water temperature sensor 17w is outputted to the ECU 30.

Incidentally, FIG. 1 illustrates an example in which the water temperature sensor 17w is located at the downstream side of the engine 20. However, as described above, the water temperature sensor 17w may be located at the downstream side of the water jacket of the engine 20. Therefore, the "downstream side of the engine 20" in the meaning of the location of the water temperature sensor 17w may indicate the downstream side of the water jacket of the engine 20.

The exhausting heat recovery equipment 11 is located on a channel (route) through which exhaust gas ejected from the engine 20 passes. Each of the exhaust gas and the cooling water flows into the exhausting heat recovery equipment 11. The exhausting heat recovery equipment 11 recovers exhaust heat by performing heat exchange by which heat is exchanged between the cooling water which flows into the exhausting heat recovery equipment 11 and the exhaust gas which flows into the exhausting heat recovery equipment 11. Namely, the exhausting heat recovery equipment 11 can heat up the cooling water by using the heat of the exhaust gas. In other words, the exhausting heat recovery equipment 11 can transfer the heat of the exhaust gas to the cooling water. Therefore, typically, the temperature of the cooling water after the cooling water passes through the exhausting heat recovery equipment 11 becomes higher than the temperature of the cooling water before the cooling water passes through the exhausting heat recovery equipment 11.

Here, a configuration of the exhausting heat recovery equipment 11 will be explained with reference to FIG. 2. FIG. 2 is a cross-sectional diagram illustrating a configuration of the exhausting heat recovery equipment 11.

As illustrated in FIG. 2(a) to FIG. 2(c), the exhaust heat recovery equipment 11 is provided with: a heat exchange equipment 110; a heat exchange channel (heat exchange passage or path) 111; a bypass channel (bypass passage or path) 112; an exhaust control valve 114; and a partition wall 115.

The heat exchange equipment 110 includes a cooling water pipe through which the cooling water flowing from the cooling water pipe 182b passes. While the cooling water passes through the cooling water pipe provided on the heat exchange equipment 110, the cooling water is heated by the exhaust gas which passes through the heat exchange channel 111. The cooling water which passes through the cooling water pipe provided on the heat exchange equipment 110 flows outwardly to the cooling water pipe 182c.

Each of the heat exchange channel 111 and the bypass channel 112 is a channel (passage or path) through which the exhaust gas from the engine 20 passes. The heat exchange channel 111 is physically separated from the bypass channel 112 by the partition wall 115. However, an entrance of the heat exchange channel 111 may not be separated from an entrance of the bypass channel by the partition wall 115. Similarly, an exit of the heat exchange channel 111 may not be separated from an exit of the bypass channel by the partition wall 115

The heat exchange equipment 110 is located in the heat exchange channel 111. Therefore, the exhaust gas which flows into the heat exchange channel 111 exchanges the heat with the cooling water which flows in to the heat exchange equipment 110. On the other hand, the heat exchange equipment 110 is not located in the bypass channel 112. Therefore, the exhaust gas which flows into the bypass channel 112 does not exchange the heat with the cooling water which flows in to the heat exchange equipment 110.

The exhaust control valve 114 is a valve for adjusting, under the control of the ECU 30, flow amount of the exhaust gas which flows into the heat exchange channel 111. Especially, the exhaust control valve 114 is preferably a valve which can change from the valve open state to the valve close state and vice versa.

For example, as illustrated in FIG. 2(a), when the state of the exhaust control valve 114 is the valve close state, the exhaust gas does not flow into the heat exchange channel 111. In this case, all of the exhaust gas which flows into the exhaust heat recovery equipment 11 flows into the bypass channel 112.

Alternatively, for example, as illustrated in FIG. 2(b) and FIG. 2(c), when the state of the exhaust control valve 114 is the valve open state, the exhaust gas flows into the heat exchange channel 111. In addition, the exhaust gas may flow into the bypass channel 112. Namely, all of the exhaust gas which flows into the exhaust heat recovery equipment 11 may flow into the heat exchange channel 111 and the exhaust gas which flows into the exhaust heat recovery equipment 11 may not flow into the bypass channel 112 (see FIG. 2(b). Alternatively, one portion of the exhaust gas which flows into the exhaust heat recovery equipment 11 may flow into the heat exchange channel 111 and another one portion of the exhaust gas which flows into the exhaust heat recovery equipment 11 may flow into the bypass channel 112 (see FIG. 2(c).

When the state of the exhaust control valve 114 is the valve open state, open degree of the exhaust control valve 114 is preferably adjusted under the control of the ECU 30. As a result, the exhaust control valve 114 can adjust the flow amount of the exhaust gas which flows into the heat exchange channel 111.

Again in FIG. 1, the heater core 12 recovers the heat of the cooling water by exchanging the heat between the air and the cooling water which passes through the inside of the heater core 12. The air heated by the heat which is recovered by the heater core 12 is blew into a vehicle cabin by a blower (which is not illustrated) for the purpose of heating, defroster, deice and the like.

The water temperature sensor 17b is located at the cooling water pipe 182c which is located between the exhaust heat recovery equipment 11 and the heater core 12. Therefore, the water temperature sensor 17b measures temperature thb of the cooling water which flows into the heater core 12 (in other words, temperature thb of the cooling water which flows outwardly from the exhaust heat recovery equipment 11). Hereinafter, the temperature thb measured by the water temperature sensor 17b is referred to as "bypass water temperature thb". Namely, in the present embodiment, temperature of the cooling water passing through the cooling water pipe 182c which is located between the exhaust heat recovery equipment 11 and the heater core 12 is used as the bypass water temperature thb. However, the temperature of the cooling water passing through one portion of the bypass pipe (for example, the cooling water pipe 182a, the cooling water pipe 182b, or the cooling water pipe 182d) may be used as the bypass water temperature thb. In this case, the water temperature sensor 17b may be located at one portion of the bypass pipe (for example, the cooling water pipe 182a, the cooling water pipe 182b, or the cooling water pipe 182d). The bypass water temperature thb which is measured by the water temperature sensor 17b is outputted to the ECU 30.

The switch valve 13 is a valve which can change the state of not-illustrated valve element from the valve open state to the valve close state and vice versa. For example, the switch valve 13 is a FCV (Flow Control Valve). For example, when the state of the switch valve 13 is the valve close state, the switch valve 13 prevents the cooling water from flowing from the cooling water pipe 181c to the cooling water pipe 181d. In this case, the cooling water remains in the cooling water pipe 181a, the cooling water pipe 181b and the cooling water pipe 181c. On the other hand, when the state of the switch valve 13 is the valve open state, the switch valve 13 allows the cooling water to flow from the cooling water pipe 181c to the cooling water pipe 181d. In this case, the cooling water flowing outwardly from the engine 20 to the cooling water pipe 181b flows into the exhaust heat recovery equipment 11 after passing through the cooling water pipes 181c and 181d. In addition, the switch valve 13 can adjust open degree of the valve element, when the state of the switch valve 13 is the valve-open-stat. Namely, the switch valve 13 can adjust the flow amount of the cooling water which flows outwardly from the switch valve 13 to the cooling water pipe 181d (substantially, the flow amount of the cooling water in the main pipe) and the flow amount of the cooling water which flows outwardly from the switch valve 13 to the cooling water pipe 183a (substantially, the flow amount of the cooling water in the sub pipe).

Incidentally, the switch valve 13, whose state is the valve close state, may not completely prevent the cooling water from flowing from the cooling water pipe 181c to the cooling water pipe 181d. In other words, the switch valve 13, whose state is the valve close state, may not cut the flow amount of the cooling water from flowing from the cooling water pipe 181c to the cooling water pipe 181d to zero. For example, the cooling water may flows outwardly from the cooing water pipe 181c to the cooling water pipe 181d via a small hole formed on the valve element of the switch valve 13. However, the switch valve 13, whose state is the valve close state, may completely prevent the cooling water from flowing from the cooling water pipe 181c to the cooling water pipe 181d. Namely, the switch valve 13, whose state is the valve close state, may cut the flow amount of the cooling water from flowing from the cooling water pipe 181c to the cooling water pipe 181d to zero.

Incidentally, FIG. 1 illustrates an example in which the switch valve 13 is located at the downstream side of the engine 20. However, the switch valve 13 may be located at the upstream side of the engine 20 (especially, a pipe part which is located at the downstream side of the position where the pipe branches into the main pipe and the bypass pipe and which is located at the upstream side of the engine 20). For example, the switch valve 13 may be located at the cooling water pipe 181a.

In the radiator 14, the cooling water which passes through the radiator 14 is cooled by the air. In this case, the wind which is introduced by the not-illustrated electric fan prompts the cooling of the cooling water in the radiator 14.

In addition, the thermostat 15 has a valve which changes its state from the valve open state to the valve close state and vice versa depending on the temperature of the cooling water (for example, the engine water temperature thw). Typically, the thermostat 15 opens its valve when the temperature of the cooling water is high (for example, higher than a predetermined temperature). In this case, the cooling water pipe 183b is connected to the cooling water pipe 18b via the thermostat 15. As a result, the cooling water passes through the radiator 14. Thus, the cooling water is cooled and the excessive heating (overheat) of the engine 20 is prevented. On the other hand, the thermostat 15 close its valve when the temperature of the cooling water is relatively low (for example, not higher than the predetermined temperature). In this case, the cooling water does not pass through the radiator 14. Thus, the decrease of the temperature of the cooling water is prevented and the excessive cooling (overcool) of the engine 20 is prevented.

The electric WP 16 has an electric motor. The electric WP 16 circulates the cooling water in the cooling water pipe 18 by using the operation of the motor. Specifically, electric power is supplied to the electric WP 16 from a battery and the rotation number of the electric WP 16 is controlled by a controlling signal supplied from the ECU 30. Incidentally, a mechanical water pump, which can operate regardless of or in connection with the operation of the engine 20 and can be controlled by the ECU 30, may be used instead of the electric WP 16, mechanical water pump.

The ECU (Electronic Control Unit) 30 has a CPU (Central Processing Unit), a ROM (Read Only Memory), a RAM (Random Access Memory) and the like which are not illustrated. The ECU 30 is one example of the "cooling water control apparatus". The ECU 30 determines whether or not the switch valve 13 provided on the cooling apparatus 10 has a failure.

(2) Specific Example of Circulation Aspect of Cooling Water in Cooling Apparatus Next, a specific example of the circulation aspect of the cooling water in the cooling apparatus 10 will be explained with reference to FIG. 3 and FIG. 4. FIG. 3 is a block diagram illustrating the circulation aspect of the cooling water when the engine water temperature thw is in a first range. FIG. 4 is a block diagram illustrating the circulation aspect of the cooling water when the engine water temperature thw is in a second range which is higher than the first range.

When the engine water temperature thw is in the first range (for example, a range lower than T1 degree C.) at which warm-up of the engine 20 is not completed, the ECU 30 output valve close request, which is a command to change the state of the switch valve 13 to the valve close state, to the switch valve 13. As a result, the state of the switch valve 13 becomes the valve close state. Moreover, in this case, the thermostat 15 closes its valve. Therefore, as illustrated in FIG. 3, the flow of the cooling water from the cooling water pipe 181c to the cooling water pipe 181d and the flow of the cooling water from the cooling water pipe 183b to the cooling water pipe 18b are prevented. Thus, the cooling water remains in the cooling water pipe 181a, the cooling water pipe 181b, the cooling water pipe 181c and the cooling water pipe 181d which form the main pipe. Similarly, the cooling water remains in the cooling water pipe 183a and the cooling water pipe 183b which form the sub pipe. On the other hand, the cooling water circulates in the cooling water pipe 18a, the cooling water pipe 182a, the cooling water pipe 182b, the cooling water pipe 182c, the cooling water pipe 182d and the cooling water pipe 18b which form the bypass pipe. Incidentally, the arrows in FIG. 3 illustrate the flowing direction of the cooling water.

On the other hand, when the engine water temperature thw is in the second range (for example, a range same as or higher than T1 degree C. and same as or lower than T2 (T2>T1) degree C.) at which the warm-up of the engine 20 is completed and the thermostat 15 does not open its valve, the ECU 30 output valve open request, which is a command to change the state of the switch valve 13 to the valve open state, to the switch valve 13. As a result, the state of the switch valve 13 becomes the valve open state. Moreover, in this case, the thermostat 15 closes its valve. Therefore, as illustrated in FIG. 4, the flow of the cooling water from the cooling water pipe 181c to the cooling water pipe 181d is allowed. On the other hand, the flow of the cooling water from the cooling water pipe 183b to the cooling water pipe 18b is prevented. Thus, the cooling water circulates in the cooling water pipe 181a, the cooling water pipe 181b, the cooling water pipe 181c and the cooling water pipe 181d which form the main pipe. Similarly, the cooling water circulates in the cooling water pipe 18a, the cooling water pipe 182a, the cooling water pipe 182b, the cooling water pipe 182c, the cooling water pipe 182d and the cooling water pipe 18b which form the bypass pipe. On the other hand, the cooling water remains in the cooling water pipe 183a and the cooling water pipe 183b which form the sub pipe. Incidentally, the arrows in FIG. 4 illustrate the flowing direction of the cooling water.

Incidentally, although specific aspect is not illustrated in the drawings for the purpose of the simplification of the explanation, when the engine water temperature thw is in a third range (for example, a range higher than T2 degree C.) at which the thermostat 15 opens its valve, the ECU 30 output the valve open request, which is the command to change the state of the switch valve 13 to the valve open state, to the switch valve 13. As a result, the state of the switch valve 13 becomes the valve open state. Moreover, in this case, the thermostat 15 opens its valve. Therefore, the flow of the cooling water from the cooling water pipe 181c to the cooling water pipe 181d and the flow of the cooling water from the cooling water pipe 183b to the cooling water pipe 18b are allowed. Thus, the cooling water circulates in the cooling water pipe 181a, the cooling water pipe 181b, the cooling water pipe 181c and the cooling water pipe 181d which form the main pipe. Similarly, the cooling water circulates in the cooling water pipe 183a and the cooling water pipe 183b which form the sub pipe. Similarly, the cooling water circulates in the cooling water pipe 18a, the cooling water pipe 182a, the cooling water pipe 182b, the cooling water pipe 182c, the cooling water pipe 182d and the cooling water pipe 18b which form the bypass pipe.

(3) First Example of Determination Operation for Determining Whether or not Valve has Failure Next, a flow of a first example of a determination operation for determining whether or not the switch valve 13 has a failure will be explained with reference to FIG. 5. FIG. 5 is a flow chart illustrating the first example of the determination operation for determining whether or not the switch valve 13 has the failure. Incidentally, in the below explanation, it is assumed that the failure of the switch valve 13 is a failure (so-called close failure) in which the state of the switch valve 13 cannot be changed from the valve close state to the valve open state. However, the failure of the switch valve 13 may be an arbitrary failure other than the close failure. For example, the failure of the switch valve 13 may be a failure (so-called open failure) in which the state of the switch valve 13 is impossible to change from the valve open state to the valve close state.

As illustrated in FIG. 5, the ECU 30 determines whether or not a pre-requirement for performing the determination operation of determining whether or not the switch valve 13 has the failure is satisfied (step S101). Such a requirement that a request for checking the vehicle 1 is outputted is one example of the pre-requirement.

As a result of the determination of the step S101, if it is determined that the pre-requirement is not satisfied (step S101: No), the ECU 30 ends its operation without actually determining whether or not the switch valve 13 has the failure. In this case, the ECU 30 may perform the determination operation of determining whether or not the switch valve 13 has the failure, again.

On the other hand, as a result of the determination of the step S101, if it is determined that the pre-requirement is satisfied (step S101: Yes), the ECU 30 determines whether or not the valve open request is outputted to the switch valve 13 (step S102). At this time, the ECU 30 preferably determines whether or not the valve open request is outputted to the switch valve 13 whose state is the valve close state.

As a result of the determination of the step S102, if it is determined that the valve open request is not outputted (step S102: No), the ECU 30 ends its operation without actually determining whether or not the switch valve 13 has the failure. The reason why the ECU 30 ends its operation is as follows. As described later in detail, in the present embodiment, the ECU 30 determines whether or not the switch valve 13 has the close failure on the basis of difference between the engine water temperature thw and the bypass water temperature thb which are measured after a lapse of a predetermined time from a timing of starting to output the valve open request. Thus, if the valve open request is not outputted, the ECU 30 cannot determine whether or not the switch valve 13 has the close failure. Thus, if the valve open request is not outputted, the ECU 30 ends its operation.

At this time, the ECU 30 may not adjust the open degree of the exhaust control valve 114 provided on the exhaust heat recovery equipment 11 (step S103). Namely, the ECU 30 may set the open degree of the exhaust control valve 114 to a fixed value (step S103). The reason why the ECU 30 sets the open degree of the exhaust control valve 114 to the fixed value is as follows. As described later in detail, the adjustment of the open degree of the exhaust control valve 114 is performed in order to improve the accuracy of the determination operation of determining whether or not the switch valve 13 has the close failure. Specifically, the adjustment of the open degree of the exhaust control valve 114 is performed in order to suppress the variation of the difference between the engine water temperature thw and the bypass water temperature thb caused by the variation of transferred heat amount which is transferred to the cooling water from the exhaust gas in the exhaust heat recovery equipment 11 (namely, recovered heat amount which is recovered by the exhaust heat recovery equipment 11 from the exhaust gas). Thus, when the ECU 30 does not determine whether or not the switch valve 13 has the close failure, the open degree of the exhaust control valve 114 has a decreased need for being adjusted. Therefore, the ECU 30 may not adjust the open degree of the exhaust control valve 114.

On the other hand, as a result of the determination of the step 102, if it is determined that the valve open request is outputted (step S102: Yes), the ECU 30 determines whether or not the engine 20 operates in a high-load operation area which is defined in advance or is set as occasion demands (step S104). Namely, the ECU 30 determines whether or not the load of the engine 20 is high load (step S104).

As a result of the determination of the step S104, if it is determined that the engine 20 operates in the high-load operation area (step S104: Yes), the ECU 30 adjust the open degree of the exhaust control valve 114 depending on the load of the engine 20 (step S105). At this time, the ECU 30 may adjust the open degree of the exhaust control valve 114 on the basis of correlation information which indicates a relationship between the load of the engine 20 and the open degree of the exhaust control valve 114. The correlation information may be stored in a memory located in the ECU 30 or accompanied by the ECU 30 in advance. Alternatively, the ECU 30 may generate the correlation information as occasion demands.

Here, one example of the correlation information which indicates the relationship between the load of the engine 20 and the open degree of the exhaust control valve 114 will be explained with reference to FIG. 6. FIG. 6 is a graph illustrating one example of the correlation information which indicates the relationship between the load of the engine 20 and the open degree of the exhaust control valve 114.

As illustrated in FIG. 6(a), the ECU 30 may adjust the open degree of the exhaust control valve 114 such that the open degree of the exhaust control valve 114 continuously decreases with the increase of the load of the engine 20. In other words, the EUC 30 may adjust the open degree of the exhaust control valve 114 such that the flow amount of the exhaust gas which flows into the heat exchange channel 111 continuously decreases with the increase of the load of the engine 20. In this case, the ECU 30 preferably adjust the open degree of the exhaust control valve 114 on the basis of the correlation information (for example, the graph illustrated in FIG. 6(a), or another correlation information such as a table, function or the like) which indicates such a relationship that the open degree of the exhaust control valve 114 continuously decreases with the increase of the load of the engine 20.

Alternatively, the ECU 30 may adjust the open degree of the exhaust control valve 114 such that the open degree of the exhaust control valve 114 decreases in a desired manner (for example, in a step-by-step manner) with the increase of the load of the engine 20. In other words, the EUC 30 may adjust the open degree of the exhaust control valve 114 such that the flow amount of the exhaust gas which flows into the heat exchange channel 111 decreases in the desired manner with the increase of the load of the engine 20. In this case, the ECU 30 preferably adjusts the open degree of the exhaust control valve 114 on the basis of the correlation information which indicates such a relationship that the open degree of the exhaust control valve 114 decreases in the desired manner with the increase of the load of the engine 20.

The correlation information (for example, the correlation information illustrated in FIG. 6(a)) which indicates the relationship between the load of the engine 20 and the open degree of the exhaust control valve 114 may be generated to realize a condition (namely, a condition illustrated in FIG. 6(b)) in which the transferred heat amount in the exhaust heat recovery equipment 11 is maintained regardless of the largeness of the load of the engine 20. Incidentally, the condition in which the transferred heat amount is maintained may be a condition in which the transferred heat amount is same regardless of the largeness of the load of the engine 20. However, the condition in which the transferred heat amount is maintained may include a condition in which a small variation of the transferred heat amount occurs (for example, variation which does not adversely and significantly affect the accuracy of the determination operation of determining whether or not the switch valve 13 has the close failure).

Alternatively, the correlation information (for example, the correlation information illustrated in FIG. 6(a)) which indicates the relationship between the load of the engine 20 and the open degree of the exhaust control valve 114 may be generated to realize a condition (namely, a condition illustrated in FIG. 6(c)) in which the transferred heat amount in the exhaust heat recovery equipment 11 decreases with the increase of the load of the engine 20.

Anyway, in the present embodiment, when the open degree of the exhaust control valve 114 is adjusted, it is preferable that the transferred heat amount in the exhaust heat recovery equipment 11 would not increase with the increase of the load of the engine 20. In other words, when the open degree of the exhaust control valve 114 is adjusted, it is preferable that a condition in which the transferred heat amount in the exhaust heat recovery equipment 11 increases with the increase of the load of the engine 20 be not realized.

Incidentally, if it is assumed that temperature of the exhaust gas does not change, the transferred heat amount in the exhaust heat recovery equipment 11 decreases with the decrease of the open degree of the exhaust control valve 114 (alternatively, with the decrease of the flow amount of the exhaust gas which flows into the heat exchange channel 111). On the other hand, if it is assumed that the open degree of the exhaust control valve 114 does not change, the transferred heat amount in the exhaust heat recovery equipment 11 increases with the increase of the temperature of the exhaust gas (namely, with the increase of the load of the engine 20). Namely, the transferred heat amount varies depending on each of the open degree of the exhaust control valve 114 and the load of the engine 20. Therefore, in the present embodiment, it is preferable that the correlation information be generated by considering the relationship between the transferred heat amount and each of the open degree of the exhaust control valve 114 and the load of the engine 20 such that the condition illustrated in FIG. 6(b) or FIG. 6(c) is realized.

Again in FIG. 5, on the other hand, as a result of the determination of the step S104, if it is determined that the engine 20 does not operate in the high-load operation area (step S104: No), the ECU 30 may not adjust the open degree of the exhaust control valve 114 provided on the exhaust heat recovery equipment 11 (step S106). Namely, the ECU 30 may set the open degree of the exhaust control valve 114 to the fixed value (step S106).

Then, the ECU 30 determines whether or not integrated engine airflow (preferably, integrated engine airflow after it is determined that the valve open request is outputted) is larger than a predetermine threshold value TH1 (step S107). Incidentally, the determination operation of determining whether or not the integrated engine airflow is larger than the predetermine threshold value TH1 at the step S107 substantially corresponds to a determination operation of determining whether or not the predetermine time lapses after it is determined that the valve open request is outputted. Moreover, the predetermined time is a time which is required for the engine water temperature thw and the bypass water temperature thb to be stable (specifically, to be stable to some extent such that the ECU 30 can determine whether or not the switch valve 13 has the close failure on the basis of the difference between the engine water temperature thw and the bypass water temperature thb) after the state of the switch valve 13 changes from the valve close state to the valve open state in response to the valve open request. Therefore, the determination operation of determining whether or not the integrated engine airflow is larger than the predetermined threshold value TH1 at the step S107 substantially corresponds to a determination operation of determining whether or not the engine water temperature thw and the bypass water temperature thb are stable to some extent such that the ECU 30 can determine whether or not the switch valve 13 has the close failure. Thus, an appropriate value is preferably set to the predetermined threshold value TH1 on the basis of the concept of the determination operation at the step S107.

As a result of the determination of the step S107, if it is determined that the integrated engine airflow is not larger than the predetermine threshold value TH1 (step S107: No), it is predicted that each of the engine water temperature thw and the bypass water temperature thb is not stable to some extent such that the ECU 30 can determine whether or not the switch valve 13 has the close failure. Thus, the ECU 30 repeats the operation after the step S102 without determining whether or not the switch valve 13 has the close failure on the basis of the difference between the engine water temperature thw and the bypass water temperature thb.

On the other hand, as a result of the determination of the step S107, if it is determined that the integrated engine airflow is larger than the predetermine threshold value TH1 (step S107: Yes), it is predicted that each of the engine water temperature thw and the bypass water temperature thb is stable to some extent such that the ECU 30 can determine whether or not the switch valve 13 has the close failure. Thus, the ECU 30 determines whether or not the switch valve 13 has the close failure on the basis of the difference (thw–thb) between the engine water temperature thw and the bypass water temperature thb.

Here, one example of the determination operation of determining whether or not the switch valve 13 has the close failure on the basis of the difference (thw–thb) will be explained. When the state of the switch valve 13 is valve close state, the cooling water remains in the main pipe and the cooling water circulates in the bypass pipe (see FIG. 3). Thus, when the state of the switch valve 13 is valve close state, the engine water temperature thw has a relatively strong tendency to increase faster than the bypass water temperature thb. Namely, when the state of the switch valve 13 is valve close state, the difference (thw–thb) between the engine water temperature thw and the bypass water temperature thb has a relatively strong tendency to become relatively large. On the other hand, when the state of the switch valve 13 is valve open state, the cooling water circulates in the main pipe and in the bypass pipe and the cooling water circulating in the main pipe and the cooling water circulating in the bypass pipe are mixed (see FIG. 4). Thus, when the state of the switch valve 13 is valve open state, the difference (thw–thb) between the engine water temperature thw and the bypass water temperature thb has a relatively strong tendency to become relatively small. Thus, the ECU 30 can determine that the switch valve 13 has the close failure if the difference (thw–thb) is relatively large under such a condition that the valve open request is outputted to the switch valve 13 (namely, under such a condition that the difference (thw–thb) is predicted to be relatively small because the state of the switch valve 13 is to be the valve open state).

In the present embodiment, the ECU 30 determines whether or not the difference (thw–thb) is larger than a predetermined threshold value TH2 in order to determine whether or not the switch valve 13 has the close failure (step S108). Incidentally, an appropriate value is preferably set to the predetermined threshold value TH2 on the basis of the above described relationship between the difference (thw–thb) and the presence of the close failure of the switch valve 13.

As a result of the determination of the step S108, if it is determined that the difference (thw–thb) is not larger than the predetermined threshold value TH2 (step S108: No), the ECU 30 determines that the switch valve 13 does not have the close failure at this time. In this case, the ECU 30 may repeat the operation after the step S102, after resetting the integrated engine airflow to zero (step S110).

On the other hand, as a result of the determination of the step S108, if it is determined that the difference (thw–thb) is larger than the predetermined threshold value TH2 (step S108: Yes), the ECU 30 determines that the switch valve 13 has the close failure.

In the present embodiment, the ECU 30 can determine relatively accurately (more accurately) whether or not the switch valve 13 has the close failure by performing the above described determination operation illustrated in FIG. 5. Hereinafter, the reason why the ECU 30 can determine relatively accurately whether or not the switch valve 13 has the close failure will be explained with reference to FIG. 7 and FIG. 8. FIG. 7 is a graph illustrating the variation aspect of the engine water temperature thw and the bypass water temperature thb in the case where the switch valve 13 does not have the close failure under such a condition that the engine 20 operates in the high-load operation area and the variation aspect of the engine water temperature thw and the bypass water temperature thb in the case where the switch valve 13 has the close failure under such a condition that the engine 20 operates in the high-load operation area. FIG. 8 is a graph illustrating the variation aspect of the engine water temperature thw and the bypass water temperature thb in the case where the switch valve 13 does not have the close failure under such a condition that the engine 20 does not operate in the high-load operation area (namely, operates in a low-and-middle-load operation area) and the variation aspect of the engine water temperature thw and the bypass water temperature thb in the case where the switch valve 13 has the close failure under such a condition that the engine 20 does not operate in the high-load operation area (namely, operates in the low-and-middle-load operation area).

Firstly, before the explanation of the reason why the ECU 30 can determine more accurately whether or not the switch valve 13 has the close failure, the engine water temperature thw and the bypass water temperature thb in the case where the open degree of the exhaust control valve 114 is not adjusted (namely, the operation at the step S105 of FIG. 5 is not performed) will be explained.

As illustrated in FIG. 7(a) and FIG. 7(b), the bypass water temperature thb becomes relatively high in the case where the engine 20 operates in the high-load operation area, compared to the case where the engine 20 operates in the low-and-middle-load operation area. Because the transferred heat amount in the exhaust heat recovery equipment 11 becomes relatively large in the case where the engine 20 operates in the high-load operation area, compared to the case where the engine 20 operates in the low-and-middle-load operation area.

Under such a condition, the engine water temperature thw and the bypass water temperature thb changes (varies) in a manner illustrated in FIG. 7(a) in the case where the switch valve 13 does not have the close failure. Incidentally, a time T1 is a time when the valve open request is outputted to the switch valve 13 (a time when the determination result becomes "Yes" at the step S102 of FIG. 5). Moreover, a time T2 is a time when the integrated engine airflow is determined to be larger than the predetermined threshold value TH1 (a time when the determination result becomes "Yes" at the step S107 of FIG. 5). Namely, the time T2 is a time when the engine water temperature thw and the bypass water temperature thb become to be stable to some extent such that the ECU 30 can determine whether or not the switch valve 13 has the close failure.

As illustrated in FIG. 7(a), even in the case where the open degree of the exhaust control valve 114 is not adjusted, the difference (thw−thb) between the engine water temperature thw and the bypass water temperature thb is relatively small at the time T2 as long as the switch valve 13 does not have the close failure. Namely, the ECU 30 can determine that the difference (thw−thb) is not larger than the predetermined threshold value TH1. Therefore, even in the case where the open degree of the exhaust control valve 114 is not adjusted, the ECU 30 is not likely to determine wrongly that the switch valve 13 has the close failure, as long as the switch valve 13 does not have the close failure.

On the other hand, as illustrated in FIG. 7(b), in the case where the open degree of the exhaust control valve 114 is not adjusted, the difference (thw−thb) between the engine water temperature thw and the bypass water temperature thb is relatively small at the time T2 even if the switch valve 13 has the close failure. Because, the bypass water temperature thb becomes relatively high in the case where the engine 20 operates in the high-load operation area, compared to the case where the engine 20 operates in the low-and-middle-load operation area. Namely, in the case where the open degree of the exhaust control valve 114 is not adjusted, the ECU 30 is likely to determine that the difference (thw−thb) is not larger than the predetermined threshold value TH1, even if the switch valve 13 has the close failure. Therefore, in the case where the open degree of the exhaust control valve 114 is not adjusted, the ECU 30 is likely to determine wrongly that the switch valve 13 does not have the close failure even if the switch valve 13 has the close failure.

So, in the present embodiment, the ECU 30 prevents the wrong determination by adjusting the open degree of the exhaust control valve 114 depending on the load of the engine 20. Specifically, in the present embodiment, as described above, the ECU 30 adjusts the open degree of the exhaust control valve 114 such that the transferred heat amount is maintained regardless of largeness of the load of the engine 20 or the transferred heat amount decreases with the increase of the load of the engine 20. Therefore, as illustrated in FIG. 7(c), the bypass water temperature becomes lower than that in the case where the open degree of the exhaust control valve 114 is not adjusted. The difference (thw−thb) between the engine water temperature thw and the bypass water temperature thb becomes relatively large at the time T2 in the case where the open degree of the exhaust control valve 114 is adjusted under such a condition that the switch valve 13 has the close failure. Namely, the ECU 30 can determine that the difference (thw−thb) is larger than the predetermined threshold value TH1 in the case where the open degree of the exhaust control valve 114 is adjusted under such a condition that the switch valve 13 has the close failure. Therefore, the ECU 30 can determine appropriately that the switch valve 13 has the close failure in the case where the open degree of the exhaust control valve 114 is adjusted under such a condition that the switch valve 13 has the close failure.

On the other hand, as illustrated in FIG. 8(a) and FIG. 8(b), in the case where the engine 20 operates in the low-and-middle-load operation area, the transferred heat amount does not change (vary) significantly even if the load of the engine 20 becomes higher, because the load of the engine 20 is originally small. Therefore, in the case where the engine 20 operates in the low-and-middle-load operation area, the bypass water temperature thb does not increase significantly even if the load of the engine 20 becomes higher. Namely, in the case where the engine 20 operates in the low-and-middle-load operation area, the ECU 30 can determine accurately whether or not the switch valve 13 has the close failure, even if the open degree of the exhaust control valve 114 is not adjusted depending on the load of the engine 20. Namely, as illustrated in FIG. 8(a), the difference (thw−thb) between the engine water temperature thw and the bypass water temperature thb is relatively small at the time T2 in the case where the switch valve 13 does not have the close failure. Thus, the ECU 30 can determine that the switch valve 13 does not have the close failure. Similarly, as illustrated in FIG. 8(b), the difference (thw−thb) between the engine water temperature thw and the bypass water temperature thb is relatively large at the time T2 in the case where the switch valve 13 has the close failure. Thus, the ECU 30 can determine that the switch valve 13 has the close failure.

Incidentally, as illustrated in FIG. 7 and FIG. 8, the difference of the operation area of the engine 20 (in other words, the difference of the load of the engine 20) affects the accuracy of the determination operation of determining whether or not the switch valve 13 has the close failure. Therefore, the "high-load operation area" is preferably set as occasion demands, such that the "high-load operation area" corresponds to or includes one part or all of the operation area of the engine 20 which could affect the accuracy of the determination operation, on the basis of the relationship between the operation area of the engine 20 and the accuracy of the determination operation.

As described above, the ECU 30 of the present embodiment can determine more accurately whether or not the switch valve 13 has the close failure by adjusting the open degree of the exhaust control valve 114 depending on the load of the engine 20, compared to the ECU which does not adjust the open degree of the exhaust control valve 114 depending on the load of the engine 20.

In addition, the ECU 30 of the present embodiment adjusts the flow amount of the exhaust gas which flows into the heat exchange channel 111 in order to determine more accurately whether or not the switch valve 13 has the close failure. In other words, the ECU 30 does not necessarily need to adjust the flow amount of the cooling water which flows into the exhaust heat recovery equipment 11 in order to determine more accurately whether or not the switch valve 13 has the close failure. Thus, the ECU 30 can determine more accurately whether or not the switch valve 13 has the close failure while maintaining such a condition that the cooling water flows into and flows outwardly from the exhaust heat recovery equipment 11. Therefore, in the present embodiment, the cooling water in the exhaust heat recovery equipment 11 hardly boils or does not boil at all due to the remains (retention) of the cooling water in the exhaust heat recovery equipment 11.

However, the ECU 30 may adjust the flow amount of the cooling water which flows into the exhaust heat recovery equipment 11 (especially, into the heat exchange equipment 110 provided on the exhaust heat recovery equipment 11) in order to determine more accurately whether or not the switch valve 13 has the close failure. Alternatively, the ECU 30 may perform an arbitrary control which can realize such a condition that the transferred heat amount is maintained regardless of the largeness of the load of the engine 20 or the transferred heat amount decreases with the increase of the load of the engine 20, in order to determine more accurately whether or not the switch valve 13 has the close failure.

Incidentally, in the above described explanation, the ECU 30 adjusts the open degree of the exhaust control valve 114 depending on the load of the engine 20, when the engine 20 operates in the high-load operation area. However, the ECU 30 may adjust the open degree of the exhaust control valve 114 depending on the load of the engine 20, even when the engine 20 operates in the low-and-middle-load operation area, in a same manner as the engine 20 operates in the high-load operation area. Namely, the ECU 20 may adjust the open degree of the exhaust control valve 114 depending on the load of the engine 20, regardless of the operation area of the engine 20 (in other words, the load of the engine 20).

Moreover, in the above described explanation, the ECU 30 determines whether or not the switch valve 13 has the close failure on the basis of the difference (thw−thb) between the engine water temperature thw and the bypass water temperature thb. However, the ECU 30 can determine whether or not the switch valve 13 has another failure (for example, the open failure) on the basis of the difference (thw−thb) between the engine water temperature thw and the bypass water temperature thb. Even in this case, the ECU 30 may adjust the open degree of the exhaust control valve 114 in a same manner as the ECU 30 determines whether or not the switch valve 13 has the close failure.

Moreover, the ECU 30 may determine whether or not the switch valve 13 has the close failure on the basis of at least one of the engine water temperature thw and the bypass water temperature thb, in addition to or instead of the difference (thw−thb) between the engine water temperature thw and the bypass water temperature thb. Even in this case, the ECU 30 may adjust the open degree of the exhaust control valve 114 in a same manner as the ECU 30 determines whether or not the switch valve 13 has the close failure.

(4) Second Example of Determination Operation for Determining Whether or not Valve has Failure Next, a flow of a second example of a determination operation for determining whether or not the switch valve 13 has a failure will be explained with reference to FIG. 9. FIG. 9 is a flow chart illustrating the second example of the determination operation for determining whether or not the switch valve 13 has the failure.

Incidentally, also in the second example, it is assumed that the failure of the switch valve 13 is the close failure. Moreover, the detailed explanation of the operation(s) which is same as the operation performed in the above first example of the determination operation will be omitted by assigning the same step number.

As illustrated in FIG. 9, the second example is different from the above described first example in the operation performed after the ECU 30 determines that the engine 20 operates in the high-load operation area. Specifically, in the second example, if it is determined that the engine 20 operates in the high-load operation area (step S104: Yes), the ECU 30 determines whether or not a heater request is outputted (step S201). Incidentally, the heater request is a command request for making the heater core 12 recover the heat of the cooling water for the purpose of the heating, the defroster, the deice and the like.

As a result of the determination of the step S201, if it is determined that the heater request is outputted (step S201: Yes), the ECU 30 determines whether or not a heat amount which the heater core 12 should recover from the cooling water (namely, a heater requested heat amount) is larger than a predetermined heat amount Qw (step S202). The predetermined heat amount Qw may be a heat amount which the heater core 12 can recover from the cooling water. Alternatively, the predetermined heat amount Qw may be a constant value which is set from another view point as occasion demands.

As a result of the determination of the step S202, if it is determined that the heater requested heat amount is larger than the predetermined heat amount (step S202: Yes), it is predicted that heat amount which the heater core 12 can recover is insufficient (namely, a desired heater performance cannot be realized). In this case, the ECU 30 adjusts the open degree of the exhaust control valve 114 depending on both of the load of the engine 20 and the heater requested heat amount (step S203). At this time, the ECU 30 may adjust the open degree of the exhaust control valve 114 on the basis of correlation information which indicates a relationship between both of the load of the engine 20 and the heater requested heat amount and the open degree of the exhaust control valve 114.

Here, one example of the correlation information which indicates the relationship between both of the load of the engine 20 and the heater requested heat amount and the open degree of the exhaust control valve 114 will be explained with reference to FIG. 10. FIG. 10 is a graph illustrating one example of the correlation information which indicates the relationship between both of the load of the engine 20 and the heater requested heat amount and the open degree of the exhaust control valve 114.

As illustrated in FIG. 10, the ECU 30 may adjust the open degree of the exhaust control valve 114 such that the open degree of the exhaust control valve 114 increases (for example, increases in a continuous manner, a step-by-step manner or a desired manner) with the increase of the heater requested heat amount. In other words, the EUC 30 may adjust the open degree of the exhaust control valve 114 such that the flow amount of the exhaust gas which flows into the heat exchange channel 111 increases with the increase of the heater requested heat amount. In this case, the ECU 30 preferably adjusts the open degree of the exhaust control valve 114 on the basis of the correlation information (for example, the graph illustrated in FIG. 10, or another correlation information such as a table, function or the like) which indicates such a relationship that the open degree of the exhaust control valve 114 increases with the increase of the heater requested heat amount.

Namely, in the second example, the ECU 30 adjusts the open degree of the exhaust control valve 114 on the basis of the load of the engine 20 as a general rule. On the other hand, if the heat amount which the heater core 12 can recover from the cooling water is insufficient only by adjusting the open degree of the exhaust control valve 114 on the basis of the load of the engine 20, the ECU 30 adjusts the open degree of the exhaust control valve 114 on the basis of the heater requested heat amount such that the a shortage of the heat amount is recovered by the exhaust heat recovery equipment 11.

Again in FIG. 9, on the other hand, as a result of the determination of the step S202, if it is determined that the heater requested heat amount is not larger than the predetermined heat amount Qw (step S202: No), it is predicted that the heat amount which the heater core 12 can recover is not insufficient (namely, the desired heater performance can be realized). In this case, the ECU 30 adjusts the open degree of the exhaust control valve 114 depending on the load of the engine 20 (step S105).

On the other hand, as a result of the determination of the step S201, if it is determined that the heater request is not outputted (step S201: No), the ECU 30 adjusts the open degree of the exhaust control valve 114 depending on the load of the engine 20 without considering the heater requested heat amount (step S105).

After the open degree of the exhaust control valve 114 is adjusted, same operation as the first example is performed in the second example. Namely, after the open degree of the exhaust control valve 114 is adjusted, the operation after the step S107 is performed in the second example in a same manner as the first example.

As described above, in the second example, the ECU 30 can adjust the open degree of the exhaust control valve 114 such that the shortage of the heat amount which the heater core 12 can recover is compensated (made up for), when the heat amount which the heater core 12 can recover is insufficient. Namely, the ECU 30 can increase the transferred heat amount such that the shortage of the heat amount which the heater core 12 can recover is compensated (made up for), when the heat amount which the heater core 12 can recover is insufficient. Therefore, the ECU 30 can get various effects which can be got in the first example while satisfying the heater performance.

The present invention is not limited to the aforementioned embodiments, but various changes may be made, if desired, without departing from the essence or spirit of the invention which can be read from the claims and the entire specification. A cooling water control apparatus, which involves such changes, is also intended to be within the technical scope of the present invention.

REFERENCE SIGNS LIST

1 vehicle
10 water apparatus
11 exhaust heat recovery equipment
12 heater core
13 switch valve
14 radiator
15 thermostat
16 electric WP
17b, 17w water temperature sensor
18 cooling water pipe
18a cooling water pipe
18b cooling water pipe
181a cooling water pipe
181b cooling water pipe
181c cooling water pipe
181d cooling water pipe
182a cooling water pipe
182b cooling water pipe
182c cooling water pipe
182d cooling water pipe
183a cooling water pipe
183b cooling water pipe
20 engine
30 ECU

The invention claimed is:

1. A cooling water control apparatus which is configured to control a cooling apparatus,
the cooling apparatus having: (i) a first pipe in which cooling water is circulated such that the cooling water passes through an engine; (ii) a second pipe in which the cooling water is circulated such that the cooling water does not pass through the engine; (iii) a valve which is located at a downstream side of the engine and which is configured to adjust a flow amount of the cooling water flowing from the first pipe to the second pipe; and (iv) an exhaust heat recovery equipment located on the second pipe,
the exhaust heat recovery equipment having: a heat exchange pipe into which exhaust gas flows and in which heat exchange between the exhaust gas and the cooling water is performed; and an adjuster which is configured to adjust a flow amount of the exhaust gas which flows into the heat exchange pipe,
the cooling water control apparatus comprising a controller,
the controller being programmed to:
perform a determination operation to determine whether or not the valve has failure on the basis of a difference between a first water temperature and second water temperature, wherein the first water temperature is temperature of the cooling water in a pipe part of the first pipe which is located between the engine and the valve, the second water temperature is temperature of the cooling water in the second pipe; and
control the adjuster during the determination operation such that (i) a transferred heat amount which is transferred to the cooling water in the exhaust heat recovery equipment decreases with an increase of a load of the engine or (ii) the transferred heat amount is maintained regardless of a magnitude of the load of the engine.

2. The cooling water control apparatus according to claim 1, wherein
the controller is programmed to control the adjuster such that the transferred heat amount increases with an increase of a requested heat amount which is requested for a predetermined operation using heat of the cooling water.

3. The cooling water control apparatus according to claim 1, wherein
the cooling apparatus further comprising a heater core which is located at a downstream side of the exhaust heat recovery equipment and which is configured to be able to recover heat of the cooling water,
the controller is programmed to control the adjuster such that the transferred heat amount increases by additional heat amount corresponding to a shortage of a recovered heat amount which the heater core can recover from the cooling water relative to requested heat amount which is requested for a predetermined operation using heat of the cooling water, when the recovered heat amount is insufficient relative to the requested heat amount only by controlling the adjuster such that (i) the transferred heat amount decreases with the increase of the load of the engine or (ii) the transferred heat amount is maintained regardless of largeness of the load of the engine.

4. The cooling water control apparatus according to claim 1, wherein, the controller is programmed to control the adjuster such that (i) the transferred heat amount decreases with the increase of the load of the engine or (ii) the transferred heat amount is maintained regardless of the largeness of the load of the engine, when the load of the engine is same as or larger than a predetermined value.

5. The cooling water control apparatus according to claim 1, wherein the controller is programmed to control the adjuster such that the flow amount of the exhaust gas which flows into the heat exchange pipe decreases with the increase of the load of the engine.

\* \* \* \* \*